United States Patent
Chamoun et al.

(10) Patent No.: US 10,228,250 B2
(45) Date of Patent: Mar. 12, 2019

(54) OPTICAL SYSTEM AND METHOD UTILIZING A LASER-DRIVEN LIGHT SOURCE WITH WHITE NOISE MODULATION

(71) Applicant: The Board of Trustees of the Leland Stanford Junior University, Palo Alto, CA (US)

(72) Inventors: Jacob N. Chamoun, Stanford, CA (US); Michel J. F. Digonnet, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 15/707,343

(22) Filed: Sep. 18, 2017

(65) Prior Publication Data

US 2018/0080770 A1 Mar. 22, 2018

Related U.S. Application Data

(60) Provisional application No. 62/397,285, filed on Sep. 20, 2016.

(51) Int. Cl.
*G01C 19/72* (2006.01)
*G01C 19/66* (2006.01)
(Continued)

(52) U.S. Cl.
CPC .......... *G01C 19/721* (2013.01); *G01C 19/66* (2013.01); *H01S 3/06795* (2013.01); *G01C 25/00* (2013.01)

(58) Field of Classification Search
CPC ...... G01C 19/72; G01C 19/721; G01C 19/66; G01C 19/727; H01S 3/06795; G01B 9/0201; G01B 9/02055; G01B 9/02075
(Continued)

(56) References Cited

U.S. PATENT DOCUMENTS 4,848,910 A 7/1989 Dupraz
5,137,357 A 8/1992 Ferrar et al.
(Continued)

FOREIGN PATENT DOCUMENTS

EP 0 393 987 10/1990
EP 0 507 536 10/1992
(Continued)

OTHER PUBLICATIONS

Agrawal, G. P., "Semiconductor Lasers", Van Nostrand Reinhold, New York, 269-275 (1993).
(Continued)

*Primary Examiner* — Tarifur R Chowdhury
*Assistant Examiner* — Johnathon Cook
(74) *Attorney, Agent, or Firm* — Knobbe, Martens, Olson & Bear, LLP

(57) ABSTRACT

An optical system is provided having a laser configured to generate light having a first laser spectrum with a first linewidth, a waveform generator configured to produce a noise waveform, and an electro-optic phase modulator in optical communication with the laser and in electrical communication with the waveform generator. The electro-optic phase modulator is configured to receive the light having the first laser spectrum, to receive the noise waveform, and to respond to the noise waveform by modulating the light to produce light having a second laser spectrum with a second linewidth broader than the first linewidth.

25 Claims, 13 Drawing Sheets

(51) Int. Cl.
*H01S 3/067* (2006.01)
*G01C 25/00* (2006.01)

(58) Field of Classification Search
USPC .......................................................... 356/460
See application file for complete search history.

(56) References Cited

U.S. PATENT DOCUMENTS

| | | | |
|---|---|---|---|
| 5,327,214 | A | 7/1994 | Asami |
| 5,761,225 | A | 6/1998 | Fidric et al. |
| 6,744,519 | B2 | 6/2004 | Lange et al. |
| 7,515,271 | B2 | 4/2009 | Greening et al. |
| 7,535,576 | B2 | 5/2009 | Keyser et al. |
| 7,911,619 | B2 | 3/2011 | Blin et al. |
| 8,223,340 | B2 | 7/2012 | Digonnet et al. |
| 2004/0165190 | A1 | 8/2004 | Chen et al. |
| 2009/0195785 | A1 | 8/2009 | Blin et al. |
| 2010/0302548 | A1 | 12/2010 | Digonnet et al. |
| 2011/0181887 | A1 | 7/2011 | Tarleton et al. |
| 2011/0304852 | A1 | 12/2011 | Keith et al. |
| 2015/0022818 | A1* | 1/2015 | Lloyd .................. G01C 19/721 356/460 |
| 2016/0226210 | A1* | 8/2016 | Zayhowski ........... H01S 3/0085 |

FOREIGN PATENT DOCUMENTS

| | | |
|---|---|---|
| JP | H03-8382 | 1/1991 |
| JP | H03-503568 | 8/1991 |
| JP | H06-507727 | 9/1994 |
| WO | WO 89/07237 | 8/1989 |
| WO | WO 93/14380 | 7/1993 |
| WO | WO 2014/039128 | 3/2014 |

OTHER PUBLICATIONS

Anderson, Brian et al.: "Experimental study of SBS suppression via white noise phase modulation", Visual Communications and Image Processing; 20-1-2004-20-1-2004; San Jose, vol. 8961, Mar. 7, 2014.
Böhm, K., et al, "Low-drift fibre gyro using a superluminescent diode," Electron. Lett. 17(10), 352-353 (1981).
Lefevre, H. C., Bergh, R. A., Shaw, H. J., "All-fiber gyroscope with inertial-navigation short-term sensitivity," Opt. Lett. 7(9), 454-456 (1982).
Burns, W. K., et al, "Excess noise in fiber gyroscope sources," Photonics Technol. Letters 2(8), 606-608 (1990).
H. Chou and S. Ezekiel, "Wavelength stabilization of broadband semiconductor light sources," Opt. Lett.10, 612-614 (1985).
J. N. Chamoun and M. J. F. Digonnet, "Noise and Bias Error Due to Polarization Coupling in a Fiber Optic Gyroscope," *J. of Lightwave Technol.* 33, 13, 2839-2847 (2015).
J. N. Chamoun and M. J. F. Digonnet, "Pseudo-random-bit-sequence phase modulation for reduced errors in a fiber optic gyroscope," Opt. Lett. 41, 5664-5667 (2016).
Cutler, C. C., et al, "Limitation of rotation sensing by scattering," Optics Letters 5(11), 488-490 (1980).
Mackintosh, J. M. and Culshaw, B., "Analysis and observation of coupling ratio dependence of Rayleigh backscattering noise in a fiber optic gyroscope", J. of Lightwave Technol. 7(9), 1323-1328 (1989).

M. J. F. Digonnet, and J. N. Chamoun, "Recent developments in laser-driven and hollow-core fiber optic gyroscopes." Proc. SPIE 9852, Fiber Optic Sensors and Applications XIII, 985204 (2016).
Digonnet, M. J. F., Lloyd, S, W., and Fan, S., "Coherent backscattering noise in a photonic-bandgap fiber optic gyroscope," Proc. SPIE 7503, 750302-1-75032-4 (2009).
P. Gallion and G. Debarge, "Quantum phase noise and field correlation in a single frequency semiconductor laser system," IEEE J. of Quantum Elec., vol. 20, No. 4, pp. 343-349 (1984).
IEEE Standard Specification Format Guide and Test Procedure for Single-Axis Interferometric Fiber Optic Gyros, *IEEE Std* 952-1997, vol., No., pp. i, 1998.
Tin Komljenovic, Minh A. Tran, Michael Belt, Sarat Gundavarapu, Daniel J. Blumenthal, and John E. Bowers, "Frequency modulated lasers for interferometric optical gyroscopes," Opt. Lett. 41, 1773-1776 (2016).
Krakenes, et al. "Effect of laser phase noise in Sagnac interferometers," J. of Lightwave Technol. 11(4), 643-653 (1993).
K. Takada, "Calculation of Rayleigh backscattering noise in fiber-optic gyroscopes," J. Opt. Soc. Am. A 2(6), 872-877 (1985).
Lloyd, S. W., Digonnet, M. J. F., and Fan, S., "Near shot-noise limited performance of an open loop laser-driven interferometric fiber optic gyroscope," Proc. SPIE 7753, 7753A3-1-7753A3-4 (2011).
Lefevre, H. C., et al, "High dynamic range fiber gyro with all-digital signal processing," Proc. SPIE 1367, 72-80 (1991).
H. C. Lefèvre, "The fiber-optic gyroscope, a century after Sagnac's experiment: The ultimate rotation-sensing technology?," C. R. Physique 15, 851-858 (2014).
Dangui, et al. "Laser-driven photonic-bandgap fiber optic gyroscope with negligible Kerr-induced drift," Opt. Lett. 34(7), 875-877 (2009).
Dangui, et al, "Phase sensitivity to temperature of the fundamental mode in air-guiding photonic-bandgap fibers," Opt. Express 13(18), 6669-6684 (2005).
S. Blin, H. K. Kim, M. J. F. Digonnet, and G. S. Kino, "Reduced thermal sensitivity of a fiber-optic gyroscope using an air-core photonic-bandgap fiber," J. of Lightwave Technol. 25(3), 861-865 (2007).
Blin, S., Digonnet, M. J. F., and Kino, G. S., "Fiber-optic gyroscope operated with a frequency-modulated laser," Proc. SPIE 7004, 70044X-1-10044X-4 (2008).
Seth W. Lloyd, "Improving fiber optic gyroscope performance using a single-frequency laser," Department of Electrical Engineering, Stanford University, 54 pages.
S. W. Lloyd, M. J. F. Digonnet, and S. Fan, "Modeling coherent backscattering errors in fiber optic gyroscopes for sources of arbitrary line width," *J. of Lightwave Technol.* 31, 13, 2070-2078 (2013).
Keang-Po Ho and J. M. Kahn, "Spectrum of externally modulated optical signals," J. of Lightwave Technol. 22, 2, 658-663 (2004).
R. F. Schuma; K. M. Killian; Superluminescent Diode (SLD) Wavelength Control in High Performance Fiber Optic Gyroscopes. Proc. SPIE 0719, Fiber Optic Gyros: 10th Anniversary Conf, 192 (Mar. 11, 1987).
International Search Report and Written Opinion for International Application No. PCT/US2017/052090 dated Nov. 27, 2017 in 17 pages.

* cited by examiner

OPTICAL SYSTEM AND METHOD UTILIZING A LASER-DRIVEN LIGHT SOURCE WITH WHITE NOISE MODULATION

CROSS-REFERENCE TO RELATED APPLICATIONS

This application claims the benefit of priority to U.S. Provisional Appl. No. 62/397,285, filed Sep. 20, 2016 and incorporated in its entirety by reference herein.

BACKGROUND

Field of the Application

The present application relates generally to optical systems and methods utilizing a laser-driven light source, and more specifically, to optical gyroscopes utilizing a laser-driven broadened light source.

Description of the Related Art

Since the initial theoretical and experimental demonstration of the fiber optic gyroscope (FOG) by Vali and Shorthill in 1976, the fiber-optic gyroscope (FOG) has become the most commercially successful fiber sensor, with several major manufacturers shipping tens of thousands of units annually worldwide.

SUMMARY

Certain embodiments described herein provide an optical system comprising a laser configured to generate light having a first laser spectrum with a first linewidth. The optical system further comprises a waveform generator configured to produce a noise waveform. The optical system further comprises an electro-optic phase modulator in optical communication with the laser and in electrical communication with the waveform generator. The electro-optic phase modulator is configured to receive the light having the first laser spectrum, to receive the noise waveform, and to respond to the noise waveform by modulating the light to produce light having a second laser spectrum with a second linewidth broader than the first linewidth.

Certain embodiments described herein provide a method of producing laser-based broadband light for use in an optical device. The method comprises using a laser to generate light having a first laser spectrum with a first linewidth. The method further comprises, in response to a noise waveform, modulating the light to have a second laser spectrum with a second linewidth broader than the first linewidth.

DETAILED DESCRIPTION

Figure 1A:
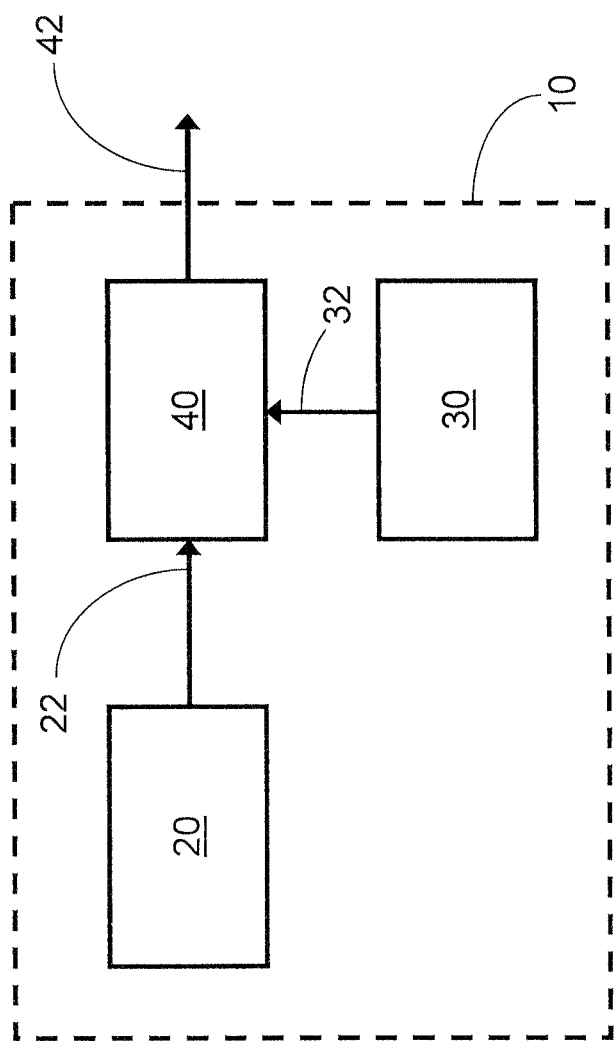
FIG. 1A schematically illustrates an optical system in accordance with certain embodiments described herein.

The performance classes of fiber optic gyroscopes (FOGs) are generally determined by three metrics: noise, drift, and scale factor stability. FOGs have found commercial success almost exclusively within the tactical performance grade, where they are used for ship and sub-sea inertial navigation, platform stabilization and positioning, missile guidance. Applications of an inertial-grade FOG could include navigation of aircraft, submarines, or spacecraft, though few FOGs with inertial-grade performance have been demonstrated, and ring laser gyroscope (RLG) technology currently dominates the aircraft navigation market. The limitation of FOG technology in the market generally derives from difficulties associated with obtaining a high-scale factor stability (e.g., below 5 parts per million (ppm), such as may be desired for aircraft navigation). In conventional FOG designs, the sensor is interrogated by broadband superfluorescent light from an Er-doped fiber source. Such sources generally have a poor mean-wavelength stability, leading to a poor scale-factor stability in the FOG. Another disadvantage of a broadband source is the fundamental excess noise associated with amplified spontaneous emission in the doped fiber, which dominates the noise and the ARW in a conventional FOG.

The use of a laser instead of a broadband superfluorescent fiber source (SFS) to interrogate the FOG can provide several benefits. First, the mean-wavelength stability of a laser can easily be much lower than the 5 ppm desired for aircraft navigation without the extensive stabilization schemes (e.g., using three or more components) that have been utilized with conventional broadband sources (see, e.g., H. Chou and S. Ezekiel, Opt. Lett. 10, 612 (1985); R. F. Schuma and K. M. Killian, Proc. SPIE 0719, Fiber Optic Gyros: 10th Anniversary Conf., 192 (1987)). Second, lasers have minimal excess noise compared to an SFS, indicating that a lower noise, or equivalently a higher sensitivity (e.g., expressed in terms of rotation rate) is possible in a laser-driven FOG. Finally, semiconductor lasers operating around 1.55 µm are less expensive than broadband sources owing to their ubiquitous use in the telecom industry. Thus, using a laser in a FOG is an appealing practical solution to make the FOG more competitive in the market for inertial navigation of aircraft.

A known downside of using a conventional laser in a FOG is that several sources of coherent errors are introduced by the coherent laser light. Studies of these residual error sources in a laser-driven FOG have found that coherent backscattering dominates the noise at all laser linewidths, while polarization coupling dominates the drift at broad laser linewidths (the linewidth above which polarization coupling dominates depends on the detail of the FOG, in particular, on the dimensions of the sensing coil, but the linewidth is on the order of 1-2 MHz for a 1-km coil wound on an 8-cm-diameter mandrel) (see, e.g., J. N. Chamoun and M. J. F. Digonnet, J. Lightwave Technol. 33, 13, 2839 (2015)). Both noise and drift can be reduced by increasing the laser linewidth. The linewidths for achieving aircraft inertial-grade noise (0.001 deg/$\sqrt{h}$) and drift (0.01 deg/h) are a few tens of GHz (see, e.g., M. J. F. Digonnet and J. N. Chamoun, Proc. SPIE 9852, *Fiber Optic Sensors and Applications XIII,* 985204 (2016)), which is much larger than the intrinsic linewidth of any single-mode laser (e.g., usually below 10 MHz).

Several techniques have been previously demonstrated to broaden the linewidth of a single-mode laser for use in a FOG. By biasing a semiconductor laser at a low, optimized power just above threshold (where the linewidth can be 100 MHz or more) (see, e.g., G. P. Agrawal, *Semiconductor Lasers*, Van Nostrand Reinhold, 269 (1993)), the noise and drift in a 1085-meter FOG were reduced to within a factor of 3 of the aircraft navigation-grade criteria. Despite this achievement, this technique had important disadvantages. Crucially, the linewidths obtained were still not broad enough to reduce the noise and drift sufficiently for aircraft navigation. In addition, the optimized bias point to obtain low noise and drift was very sensitive to the specific linewidth versus output power characteristic of the laser, thereby limiting the applicability of this technique. Alternatively, laser frequency modulation through direct modulation of the injection current that powers the laser has been shown to broaden the laser spectrum to GHz levels and to correspondingly reduce the noise in a laser-driven FOG compared to the unmodulated case (see, e.g., T. Komljenovic, M. A. Tran, M. Belt, et al., Opt. Lett. 41, 1773 (2016); S. Blin, M. J. F. Digonnet, and G. S. Kino, *19th International Conference on Optical Fibre Sensors,* 7004 (2008)). However, current modulation adds intensity noise to the laser field, and it degrades the mean-wavelength stability of the laser through coupling between the laser output power and operating wavelength (see, e.g., G. P. Agrawal, cited above).

In another technique, the linewidth can be broadened by using an external phase modulator driven by a pseudo-random bit sequence (PRBS), which can produce a laser-driven FOG with a noise level (e.g., 0.00073 deg/$\sqrt{h}$) below the aircraft inertial-grade criterion (see, e.g., J. N. Chamoun and M. J. F. Digonnet, "*Pseudo-random-bit-sequence phase modulation for reduced errors in a fiber optic gyroscope,*" submitted to Opt. Lett.). While the drift in this FOG was also low (e.g., 0.023 deg/h), it was higher than the aircraft navigation-grade drift level of 0.01 deg/h. This drift level is caused, at least in part, because PRBS phase modulation creates carrier harmonics in the modulated optical spectrum, and these narrow-linewidth features increase the noise and the drift of the FOG.

While certain embodiments are described herein in the context of a laser-driven fiber-optic gyroscope (FOG), other optical devices may utilize and benefit from the use of a laser-driven broadened light source (e.g., a laser-driven light source having a linewidth-broadened optical spectrum) with a high extinction of the carrier in accordance with certain embodiments described herein. Such optical devices include, but are not limited to: optical devices comprising integrated optics (e.g., IFOG), optical devices employing molecular spectroscopy (e.g., gas analyzers), lasers based on optical pumping of Doppler-broadened absorption, high power laser systems which suffer from stimulated Brillouin scattering (SBS), optical devices utilizing white light interferometry, and optical devices utilizing coherence domain reflectometry including optical coherence tomography (OCT) for medical or other imaging.

To reduce the noise and drift (also referred to as bias errors) induced by coherent optical effects (e.g., backscattering and polarization coupling) in a laser-driven FOG, modeling has shown that it is advantageous to broaden the linewidth of the light received from the laser. Previous systems and methods for generating light having a broadened linewidth (e.g., reduction of the electric current provided to the laser; external intensity modulation of the laser output; phase modulation of the laser output using pseudo-random bit sequence (PRBS) phase modulation) have shown significant improvements, but they have not yet been able to reduce the noise and drift sufficiently to meet the stringent operational criteria desired for the inertial navigation of an aircraft, for example, below 0.001 degree/(hour)$^{1/2}$ for the angular random walk (ARW) or noise, and below 0.01 degree/hour for the bias error or drift.

Certain embodiments described herein disclose a system and method which utilizes laser light with a linewidth broadened by modulating the phase of the laser output field with an electro-optic modulator (EOM) driven by a white-noise source. For example, the white-noise source can comprise a Gaussian white-noise (GWN) source. For another example, the white-noise source can utilize a completely saturated amplifier with the signal jumping between its maximum and minimum values, e.g., for a signal having a maximum values of +1 and a minimum value of −1, varying the signal between +1 and −1 randomly (similar to a PRBS phase modulation but with an infinite bit rate), which can be referred to as a "binary" white-noise source. While such systems and methods are described (e.g., described in the context of a FOG, other optical systems and methods may also advantageously utilize such broadened optical spectra, examples of which are listed above.

In certain embodiments, the white-noise (e.g., GWN) modulation of the phase of the laser output can provide one or more of the following advantages:

Inhibiting (e.g., reducing, eliminating, avoiding) the introduction of harmonics of the carrier in the broadened optical spectrum (e.g., harmonic intensities that are less than 5% of the total optical spectrum intensity, harmonic intensities that are less than 1% of the total optical spectrum intensity, harmonic intensities that are substantially zero). For example, the broadened optical spectrum can be devoid of harmonic peaks. Inhibiting carrier harmonics in the broadened optical spectrum of a FOG can be advantageous since such harmonics are spectrally narrow and contribute to backscattering noise and drift, thereby being detrimental in the FOG.

Producing a broadened optical spectrum that is Gaussian with a linewidth that can be significantly wider than the electrical bandwidth of the noise voltage source that drives the EOM. For example, in certain embodiments, a ratio of the optical bandwidth to the electrical bandwidth can be greater than 1 (e.g., 17 GHz/11 GHz), greater than 2, greater than 3, or greater than 1 and less than or equal to 4 (e.g., 44 GHz/11 GHz). Certain such embodiments can advantageously reduce the need for high-speed electronics as compared to that for other modulation schemes, such as pseudo-random-bit-sequence (PRBS) modulation schemes.

Suppressing (e.g., weakening) the residual carrier signal such that the residual carrier signal advantageously contributes significantly less noise and/or less drift to the total noise and/or drift of the FOG than does the broadened portion of the spectrum (e.g., contributing less than 10% of the total noise and/or drift; contributing less than 5% of the total noise and/or drift), where the total noise/drift is the quadratic sum (square root of the sum of the squares) of the noise/drift contribution caused by the residual carrier and the noise/drift contribution caused by the broadened component. Alternatively, the level of suppression of either noise or drift can be expressed using a percentage (e.g., less than 5%, less than 1%) corresponding to a ratio of the contribution caused by the residual carrier to the contribution caused by the broadened component. The carrier suppression can alternatively be expressed as a ratio between the residual carrier power with phase modulation and the residual carrier power with no phase modulation. The fraction of drift contributed by the carrier component depends on the intrinsic laser linewidth (e.g., a narrower linewidth corresponding to more drift from the carrier so that a larger fraction of the drift is due to the residual carrier). For example, for a measured drift that is substantially the same (e.g., within 10% of one another) when using either a 2-kHz laser or a 10-MHz laser with phase modulation, the carrier drift for the 10-MHz laser can be about three orders of magnitude lower than that for the 2-kHz laser, while the observed drift can be almost entirely from the broadened component (e.g., the carrier drift contributed less than about 10% of the overall drift).

Producing a broadened optical spectrum that has the same spectral characteristics (e.g., linewidth and residual carrier signal) independently of the inherent linewidth of the laser source. For example, within a broad range of frequencies, the properties of the FOG can advantageously be very weakly dependent on the laser used, which can relax manufacturing tolerances for the FOG. For example, using a laser with a 2-kHz linewidth and using a laser with a 10-MHz linewidth, after broadening, can give about the same noise (e.g., within less than 20%; within less than 30%), despite the more than three orders of magnitude in intrinsic linewidth.

In certain embodiments described herein, a laser-driven FOG utilizes a laser source with the light received from the laser having a linewidth that is broadened using a GWN source. In certain such embodiments, the FOG has an ARW of $5.5 \times 10^{-4}$ degree/(hour)$^{1/2}$ and a bias error drift of 0.007 degree/hour, both of which are about 30% below the levels considered to be sufficient for navigation-grade use in an aircraft. In certain such embodiments, the measured long-term mean-wavelength stability of the broadened light source is 0.15 parts per million (ppm), which is close to the stability of the un-broadened laser, and which is indicative of this broadening technique producing a high scale-factor stability (e.g., a stability sufficient for inertial navigation of an aircraft).

Certain embodiments described herein substantially overcome the limitations associated with PRBS modulation by using GWN modulation to strongly suppress the optical carrier. Certain embodiments described herein are the first demonstration of a FOG that meets the three criteria of noise, drift, and scale factor stability for aircraft navigation. Certain embodiments described herein provide a laser-driven FOG with a noise level below that of the same FOG driven by an Er-doped broadband source. Certain embodiments described herein provide performance that is insensitive to the original laser linewidth, thereby providing a versatile modulation scheme.

In certain embodiments described herein, a laser-driven FOG meets the desired operational levels for aircraft navigation by providing a noise of $5.5 \times 10^{-4}$ deg/$\sqrt{h}$, a drift of 0.007 deg/h, and a mean-wavelength stability of 0.15 ppm. Certain embodiments provide this performance by broadening the phase of the laser that drives the FOG with Gaussian white noise. Certain embodiments do not include any additional improvements, such as active means of isolation against temperature and temperature-gradient variations or vibrations, temperature modeling, and no active wavelength control, while certain other embodiments include one or more of these additional improvements. Certain embodiments provide this performance with two lasers of extremely different native linewidths (~2.2 kHz and 10 MHz), showing that this modulation technique is very effective at reducing both backscattering and polarization-coupling noise and drift regardless of the original temporal coherence of the laser. In certain embodiments, the performance of a laser-driven FOG can meet or exceed the performance of a FOG driven by a broadband source, paving the way for a less expensive and more competitive generation of FOGs with aircraft-navigation capability.

General Setup and Analytic Calculation

FIG. 1A schematically illustrates an optical system 10 in accordance with certain embodiments described herein. The optical system 10 comprises a laser 20 configured to generate light 22 having a first laser spectrum with a first linewidth. The optical system 10 further comprises a waveform generator 30 configured to produce a noise waveform 32. The optical system 10 further comprises an electro-optic phase modulator 40 in optical communication with the laser 20 and in electrical communication with the waveform generator 30. The electro-optic phase modulator 40 is configured to receive the light 22 having the first laser spectrum, to receive the noise waveform 32, and to respond to the noise waveform by modulating the light 22 to produce light 42 having a second laser spectrum with a second linewidth broader than the first linewidth.

Figure 1B:
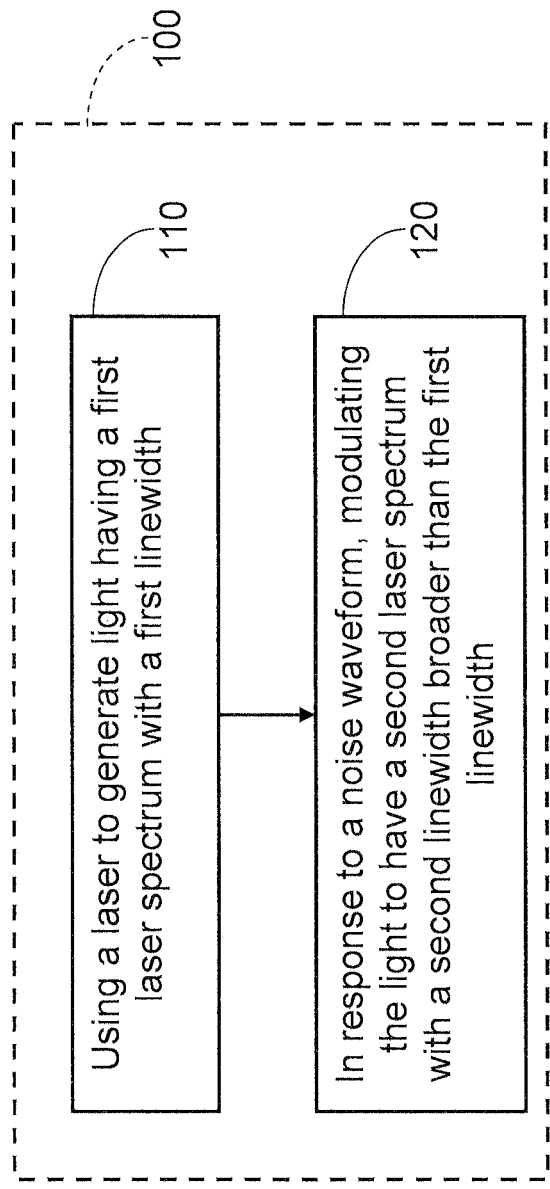
FIG. 1B is a flow diagram of an example method of producing laser-based broadband light for use in an optical device in accordance with certain embodiments described herein FIG. 1C schematically illustrates an example optical system compatible for use with a FOG setup in which the linewidth of a laser is broadened using phase modulation with Gaussian white noise (GWN) in accordance with certain embodiments described herein.

FIG. 1B is a flow diagram of an example method 100 of producing laser-based broadband light for use in an optical device in accordance with certain embodiments described herein. In an operational block 110, the method 100 comprises using a laser to generate light having a first laser spectrum with a first linewidth. In an operational block 120, the method further comprises, in response to a noise waveform, modulating the light to have a second laser spectrum with a second linewidth broader than the first linewidth.

Figure 1C:
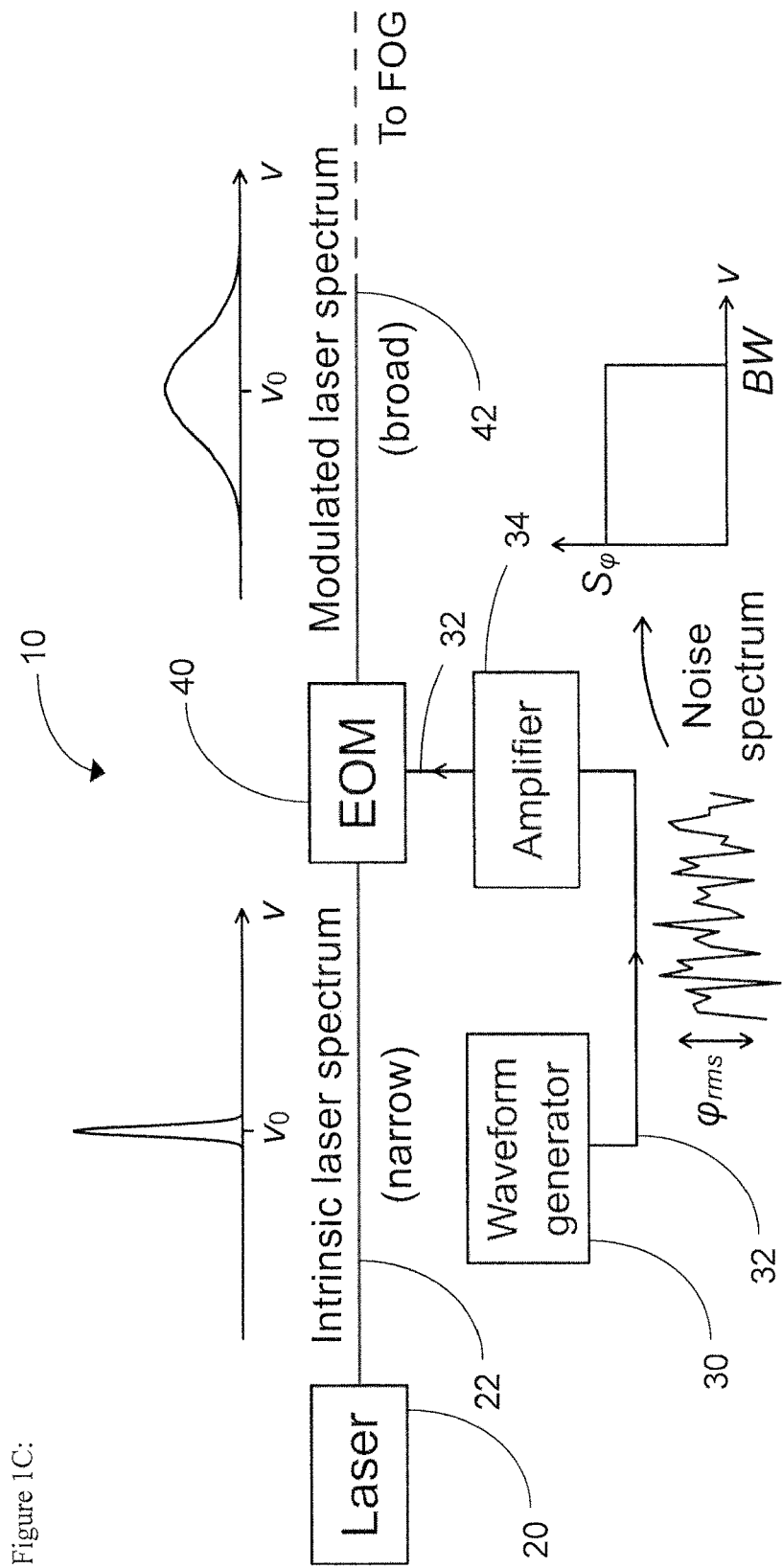

FIG. 1C schematically illustrates an example optical system 10 compatible for use with a FOG setup in which the linewidth of a laser 20 is broadened using phase modulation with Gaussian white noise (GWN) in accordance with certain embodiments described herein. This example optical system 10 can be used as a basis for an analytical calculation of the optical spectrum of a laser field that is phase modulated with GWN as discussed herein. In the example optical system 10 schematically illustrated by FIG. 1C, light 22 is generated by a single-transverse-mode laser 20, the light 22 having an intrinsic laser spectrum. The light 22 is modulated by an optical modulator 40 (e.g., an electro-optic phase modulator (EOM)) that broadens the laser spectrum of the light 22, producing light 42 which is transmitted to the FOG 50. A waveform generator 30 produces a noise waveform 32 (e.g., a Gaussian white-noise waveform) that is amplified by at least one amplifier 34 (e.g., by one or more RF amplifiers) and used to drive the optical modulator 40. The electrical spectrum of the amplified noise outputted from the at least one amplifier 34 comprises white noise, with a cutoff bandwidth BW (in Hz) and a constant power spectral density $S_V$ (expressed in $V^2$/Hz). For a linear optical modulator 40, the corresponding phase noise added onto the laser field has the same bandwidth BW and a power spectral density given by $S_\varphi(\text{rad}^2/\text{Hz})=(\pi/V_\pi)^2 \cdot S_V$, where $V_\pi$ is the voltage which produces a $\pi$-phase shift in the optical modulator 40. The root mean square (RMS) phase fluctuation added by the phase modulation 32 is then $\varphi_{rms}^2 = BW \cdot S_\varphi$.

Figure 2:
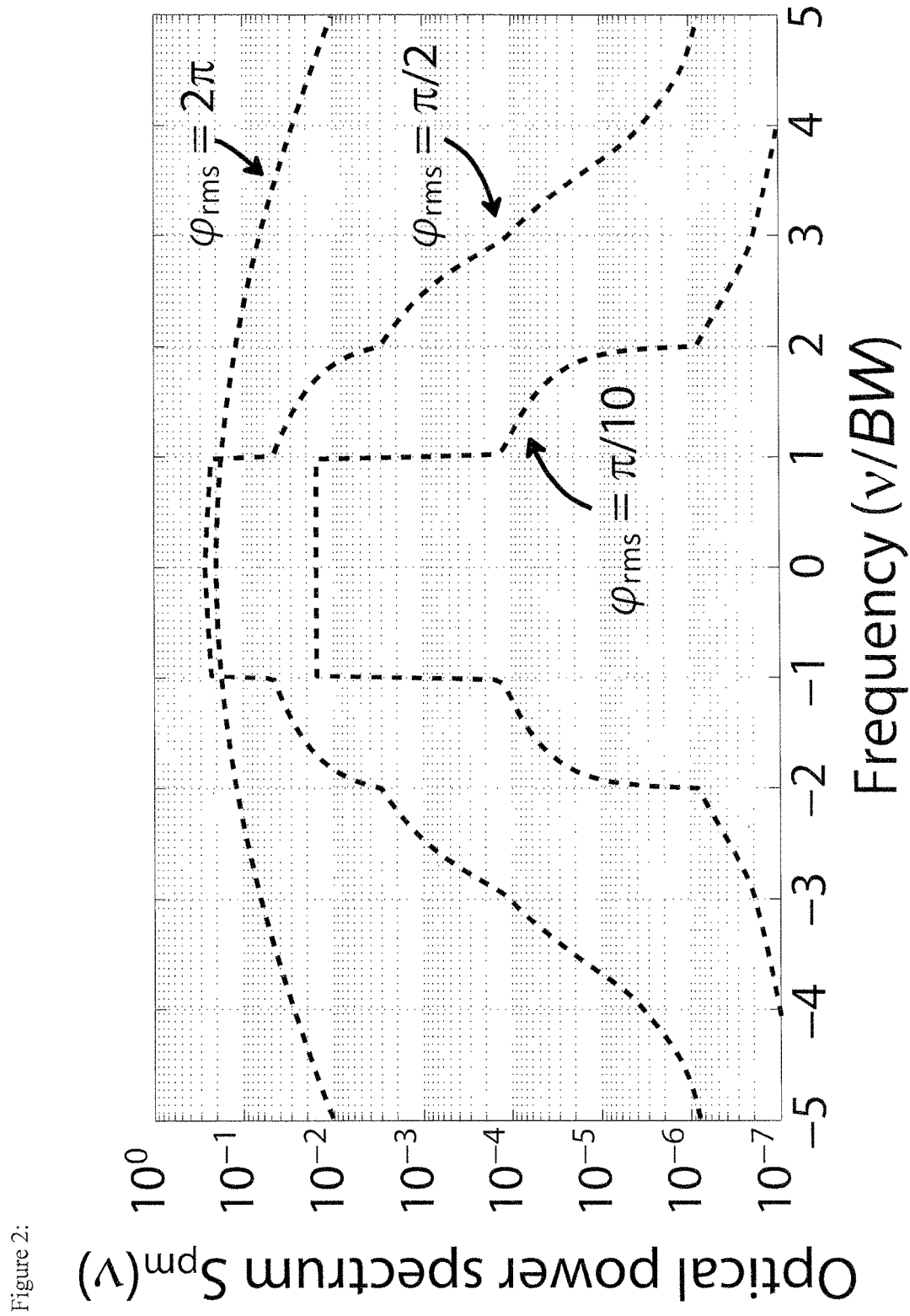
FIG. 2 shows example shapes of a portion of an optical spectrum broadened with GWN, calculated for different values of $\varphi_{rms}$.

While the spectrum of a laser with white phase noise has not previously been studied in detail, lasers with white frequency noise have been analyzed extensively (see, e.g., P. Gallion and G. Debarge, "Quantum phase noise and field correlation in single frequency semiconductor laser systems," in *IEEE Journal of Quantum Electronics*, vol. 20, no. 4, pp. 343-349, April 1984). FIG. 2 shows example shapes of a portion of an optical spectrum broadened with GWN, calculated for different values of $\varphi^{rms}$. As the phase noise increases, the shape of the spectrum changes from a "top-hat" shape, which reflects the spectral distribution of the driving electrical noise in the limit of weak modulation, to a Gaussian in the limit of strong modulation.

In the limit of strong modulation (e.g., top curve in FIG. 2), the modulated laser spectrum $S_{mod}(v)$ can be expressed as:

$$S_{mod}(v) = S_{las}(v) * S_{pm}(v) \quad (1)$$

where $$S_{pm}(v) = e^{-\frac{S_\varphi BW}{\pi}} \delta(v) + \frac{1}{\sqrt{2\pi\sigma^2}} e^{-\frac{v^2}{2\sigma^2}} \text{ and } \sigma^2 = BW^3 S_\varphi / 3\pi \quad (2)$$

and $S_{las}$ is the original laser lineshape without phase modulation. As shown by Eq. (2), the Gaussian phase modulated laser spectrum has two components: (i) a residual optical carrier component with a narrow linewidth $\Delta v_c$ (first term), and (ii) a broadened component with linewidth $\Delta v_b$ due to the phase modulation (second term). The optical carrier component, expressed by the first term on the right-hand side of Eq. (1), carries a fraction $f_c$ of the power, given by:

$$f_c = e^{-\frac{S_\varphi BW}{\pi}} \quad (3)$$

The broadened component, expressed by the second term on the right-hand side of Eq. (1), has a Gaussian lineshape, with a full-width-at-half-maximum (FWHM) given by:

$$\Delta v_b = \sqrt{(8\ln 2/3\pi) S_\varphi BW^3} \quad (4)$$

Figure 3A:
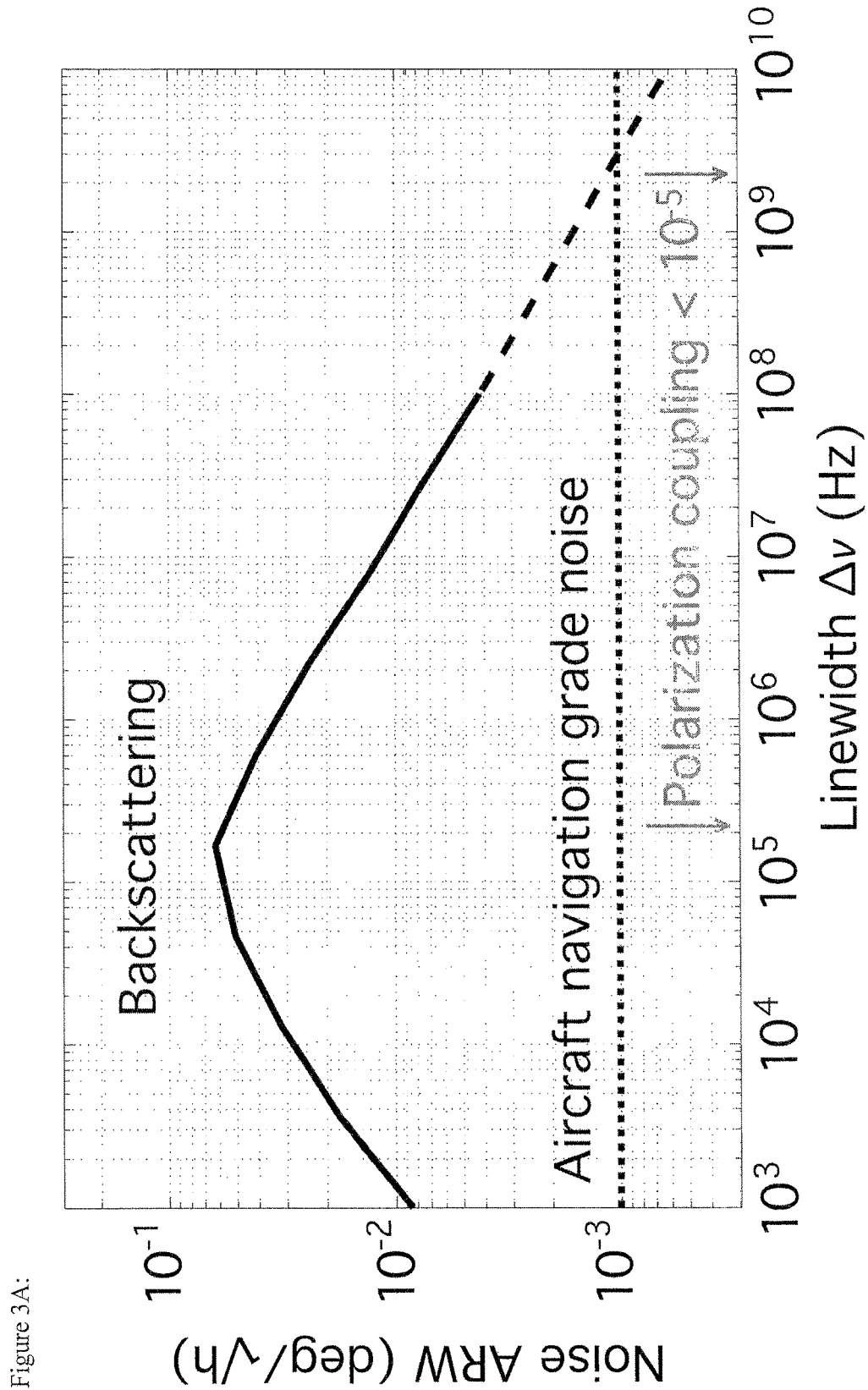
FIGS. 3A and 3B shows example plots of noise and drift, respectively, as a function of linewidth for a laser-driven FOG with coil length L=1085 meters using a backscattering model and a polarization coupling model.
Figure 3B:
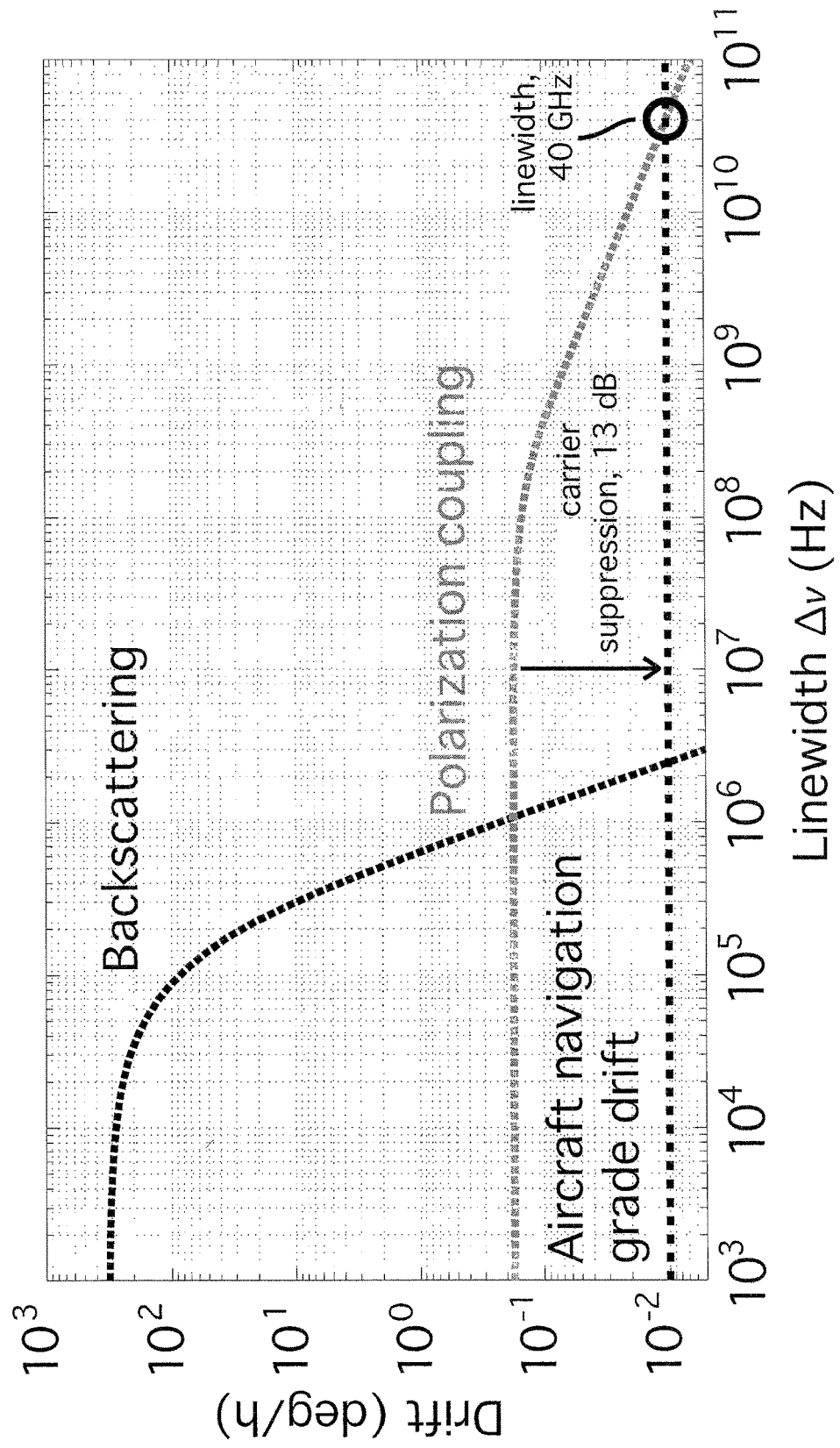

The FOG noise $\sigma(\Delta v)$ and drift $\phi(\Delta v)$ resulting from each of these two components alone can be calculated from their respective linewidths, $\Delta v_c$ and $\Delta v_b$, calculated using a coil length and radius of an example FOG using models of backscattering and polarization coupling. For example, FIGS. 3A and 3B shows example plots of noise and drift, respectively, as a function of linewidth for an example laser-driven FOG with coil length L=1085 meters using a backscattering model (see, e.g., S. W. Lloyd, M. J. F. Digonnet and S. Fan, "Modeling Coherent Backscattering Errors in Fiber Optic Gyroscopes for Sources of Arbitrary Line Width," in *Journal of Lightwave Technology*, vol. 31, no. 13, pp. 2070-2078, Jul. 1, 2013) and a polarization coupling model (see, e.g., J. N. Chamoun and M. J. F. Digonnet, "Noise and Bias Error Due to Polarization Coupling in a Fiber Optic Gyroscope," in *Journal of Lightwave Technology*, vol. 33, no. 13, pp. 2839-2847, Jul. 1, 2015). The dashed line in the noise plot of FIG. 3A is an extrapolation based on a calculated backscattering noise. FIG. 3A shows that in certain embodiments the noise in a laser-driven FOG is dominated exclusively by backscattering noise, with polarization coupling noise being far lower. The backscattering noise decreases monotonically for increasing linewidths larger than 100 kHz. FIG. 3B shows that the drift in certain embodiments is dominated by backscattering at narrow linewidths, and this drift decreases rapidly for linewidths larger than 100 kHz. Polarization coupling in certain embodiments dominates the drift at broad linewidths larger than 1 MHz until it too decreases monotonically for linewidths larger than 100 MHz. Ultimately, FIGS. 3A and 3B show that the lowest noise and drift can be achieved at the broadest linewidths, underlining the necessity of broadening the laser linewidth beyond what is accessible by other means.

If a fraction $f_c$ of the optical power is in the carrier component and a fraction $1-f_c$ is in the broadened component, the total FOG noise $\sigma_{tot}$ and drift $\phi_{tot}$ of certain embodiments can be estimated as:

$$\sigma_{tot}^2 = (1-f_c)^2 \sigma(\Delta v_b)^2 + f_c^2 \sigma(\Delta v_c)^2 \quad (5)$$

$$\phi_{tot}^2 \approx (1-f_c)^2 \phi(\Delta v_b)^2 + f_c^2 \phi(\Delta v_c)^2 \quad (6)$$

Eq. (5) is exact for the FOG backscattering noise, which arises from conversion of laser phase fluctuations into intensity fluctuations at the output. Because the intrinsic laser phase fluctuations and external modulation phase fluctuations are uncorrelated, the noise from the carrier component is uncorrelated with the noise from the broadened component, so the two contributions add in quadrature to produce the total noise. For the drift, Eq. (6) is only approximate, as the drift arises from environmental fluctuations in specific regions of the FOG sensing coil: a region one coherence length $L_c$ around the coil middle for the backscattering drift and a region one depolarization length at the coil endpoints for the polarization coupling drift. Because at least a portion of these regions contributes to the drift for arbitrary $\Delta v$, the drift arising from the broadened component and the drift arising from the carrier component are only approximately statistically independent, leading to the approximate equality in Eq. (6).

For aircraft navigation-grade noise and drift, the criteria of $\sigma_{tot} \leq \sigma_{nav}$ and $\phi_{tot} \leq \phi_{nav}$ can be defined in certain embodiments. Eq. (5) and Eq. (6) impose two conditions on the modulated laser spectrum to satisfy these criteria in certain embodiments. One condition is that the noise and drift from the broadened component be below the navigation-grade levels, e.g., the broadened component be sufficiently broad to satisfy $\sigma(\Delta v_b) \leq \sigma_{nav}$ and $\phi(\Delta v_b) \leq \phi_{nav}$. Another condition is that the noise and drift from the residual carrier component must be below the navigation-grade levels, e.g., the carrier fraction $f_c$ be sufficiently small such that $f_c \sigma(\Delta v_c) \leq \sigma_{nav}$ and $f_c \phi(\Delta v_c) \leq \phi_{nav}$. In some circumstances, each of these conditions may be necessary but not sufficient for navigation-grade noise and drift. For example, in the presence of drift from both the broadened component and suppressed carrier, in certain embodiments, the drift contributions can each be somewhat below the navigation-grade criteria to satisfy Eq. (6).

These two conditions can be expressed using two figures of merit for linewidth broadening with Gaussian phase modulation: (i) the spectral width $\Delta v_b$ of the broadened component of the modulated light field spectrum and (ii) the carrier suppression $f_c$ of the optical carrier component (e.g., the fraction of power in the optical carrier and any of its harmonics) of the laser spectrum. To be indicative of navigation-grade levels for noise and drift, in certain embodiments, $\Delta v_b$ can be broad, and $f_c$ can be strongly suppressed. For example, in a 1085-m FOG driven by a 10-MHz laser with phase modulation, example figures of merit signifying navigation-grade drift are $\Delta v_b \geq 40$ GHz and $f_c \leq -13$ dB, as shown in FIG. 3B. The reduction in drift that was previously achieved with PRBS phase modulation was limited because PRBS modulation of a laser with an intrinsic linewidth of 10 MHz did not satisfy these criteria for either $\Delta v_b$ or $f_c$.

Eq. (3) and Eq. (4) express these two figures of merit calculated for a laser-driven optical device (e.g., FOG) with GWN phase modulation. Eq. (3) shows that the carrier component is exponentially suppressed with increasing noise strength $S_\phi$ or increasing bandwidth BW. Further, unlike PRBS phase modulation where the PRBS amplitude must be fixed close to $\pi$ radians for good carrier suppression, Eq. (3) shows that GWN phase modulation is tolerant of errors in the noise strength $S_{100}$. Specifically, any value of $S_{100}$ that is larger than some minimum value will yield a suppression better than a certain value. Eq. (4) demonstrates that the linewidth $\Delta v_b$ of the broadened component of the laser spectrum of certain embodiments can be significantly broader than the bandwidth BW of the driving electrical noise, which can be another advantage of using GWN phase modulation over PRBS modulation in certain embodiments. For example, for $\phi_{RMS} = \sqrt{S_\phi BW} = 2\pi$ and BW=10 GHz, the two figures of merit can be calculated to be $\Delta v_b = 48$ GHz and $f_c = -54$ dB, both of which can satisfy levels signifying navigation-grade noise and drift (e.g., $\Delta v_b \geq 40$ GHz and $f_c \leq -13$ dB, as shown in FIG. 3B). In certain such embodiments, the navigation-grade phase shifts and noise bandwidth can be realized using off-the-shelf broadband noise generators, RF amplifiers, and phase modulators.

Figure 4:
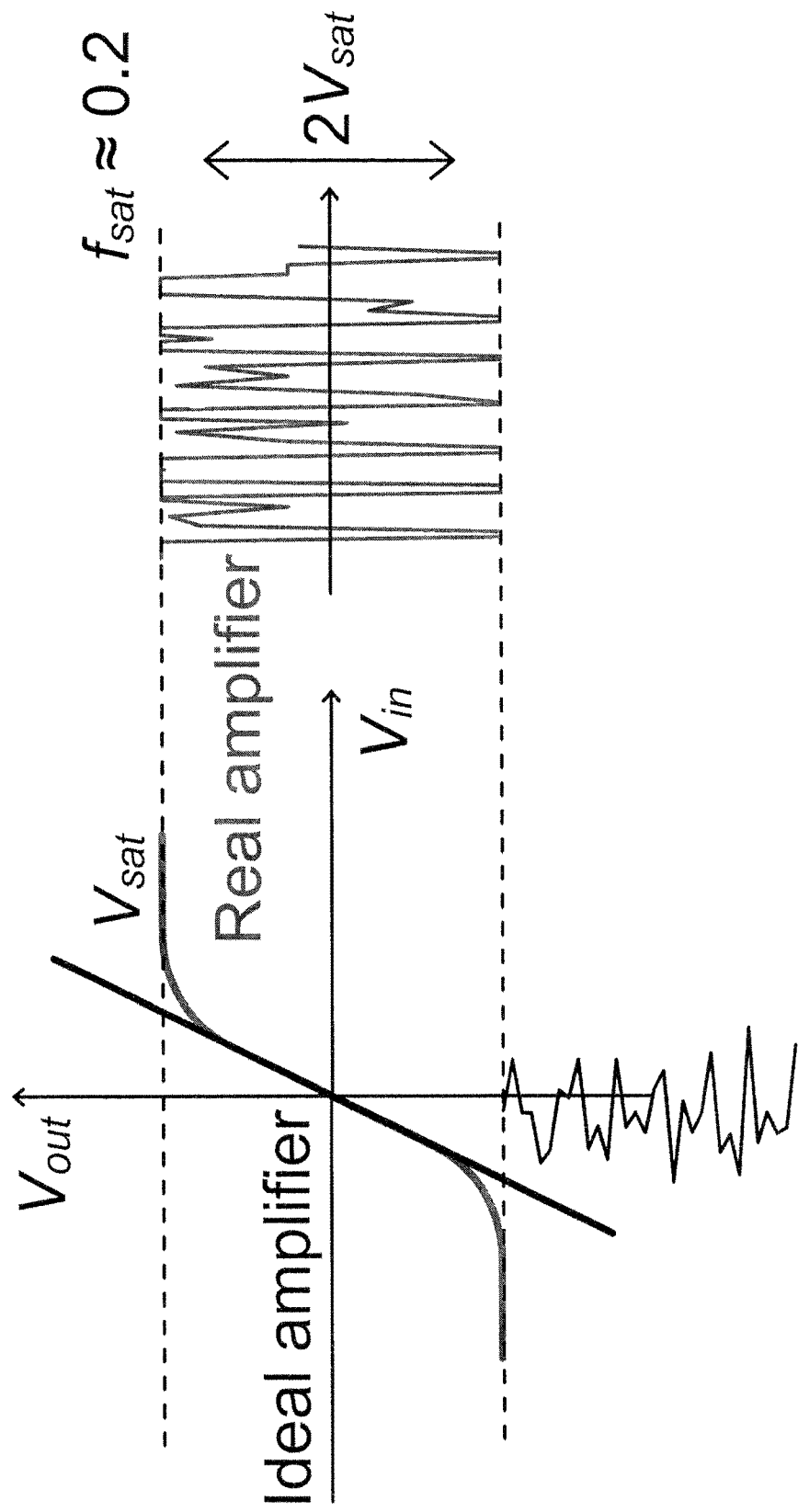
FIG. 4 is a plot of the linear response of an ideal amplifier compared to an example response of a real amplifier, illustrating an example clipping of the amplified noise due to amplifier saturation.

In a real amplifier, nonlinear effects can clip the amplified noise modulation waveform at about $\pm V_{sat}$, the saturation level of the amplifier. FIG. 4 is a plot of the linear response of an ideal amplifier compared to an example response of a real amplifier, illustrating an example clipping of the amplified noise due to amplifier saturation. Clipping of the noise causes the carrier fraction to deviate from Eq. (3) since this clipping of the amplified noise is not qualitatively captured in Eq. (3) or Eq. (4), since these equations were developed under the assumption of linear amplifiers.

Measurements from an Example System

Figure 5A:
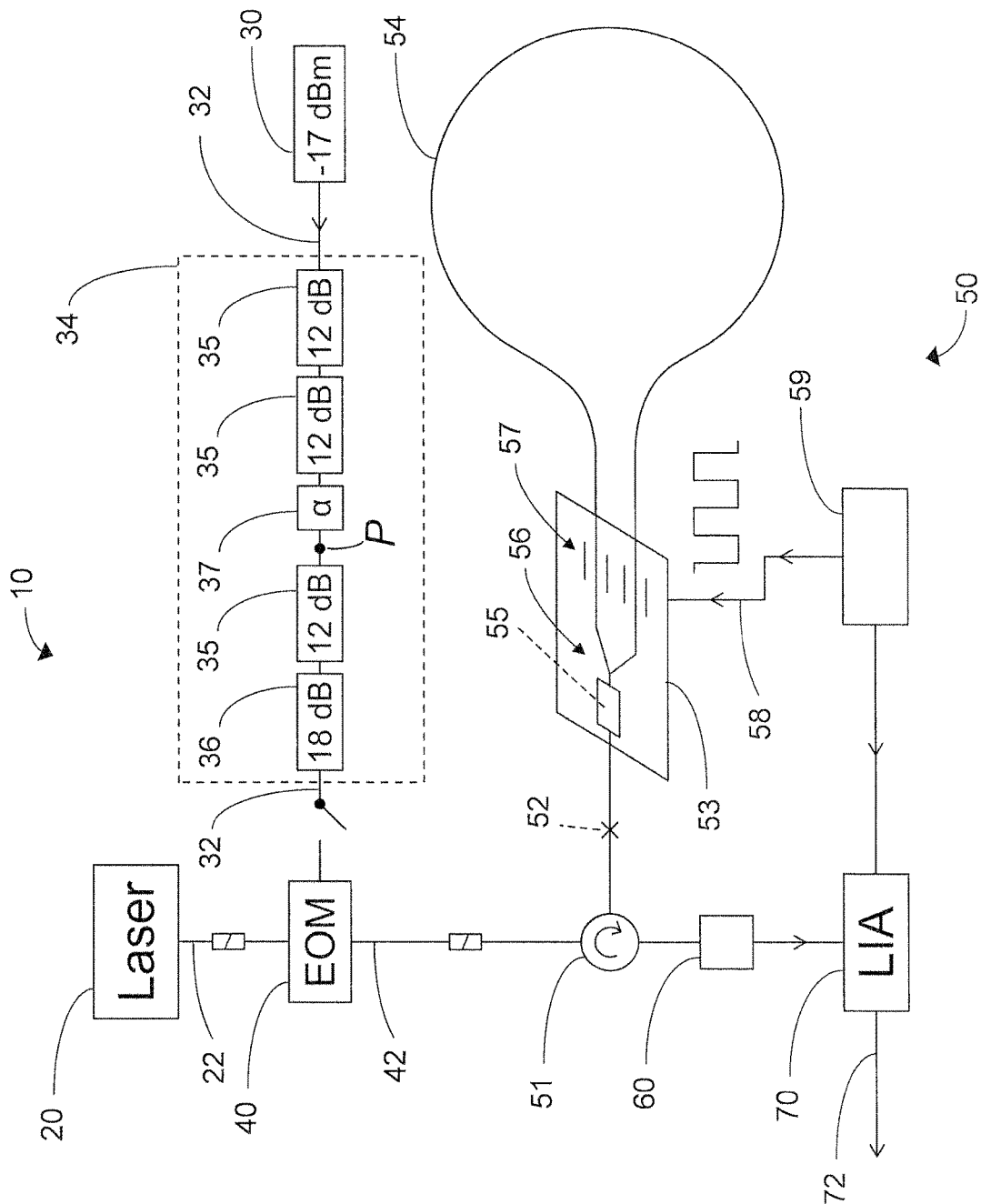
FIG. 5A schematically illustrates an example FOG optical system in accordance with certain embodiments described herein.

FIG. 5A schematically illustrates an example FOG optical system 10 in accordance with certain embodiments described herein. The light source 20 can comprise a laser (e.g., a 10-MHz-linewidth laser, such as Lucent D2525P) whose output light 22 is fed into an optical input of an optical modulator 40 (e.g., a 12-GHz EOM, such as Photline MPZ-LN10) with $V_\pi = 4.7$ V. The optical modulator 40 can be driven by broadband Gaussian noise 32 (e.g., with a bandwidth of BW=11 GHz) from a noise source 30 (e.g., Noisewave NW10-G) or another kind of non-Gaussian noise source. The low-level output noise 32 of the noise source 30 can be amplified by at least one amplifier 34 (e.g., by a RF amplifier chain; by three 14-GHz preamps, such as Minicircuits ZX60-14012L, and finally by a 12-GHz amplifier, such as SHF 100 CPP; by three 12-GHz preamps 35 and finally by a 18-GHz amplifier 36) for which $2V_{sat} = 12.6$ V. The amplifiers of the at least one amplifier 34 can be selected to provide sufficient bandwidth to amplify the noise 32. A variable RF attenuator 35 can be used to adjust the RF signal level in the amplifier chain. Fine-tuning of the RF attenuation can be accomplished by adjusting the supply voltage to the first preamplifier after the noise source 30.

The phase-modulation-broadened light 42 from the modulator 40 can be directed either into an optical spectrum analyzer (OSA)(e.g., Ando AQ6317B) to study the optical spectrum shape and linewidth of the broadened spectrum, or to a FOG assembly 50 in optical communication with the broadened source to drive the FOG assembly 50 using the broadened light 42, and its noise and drift can be measured. The FOG assembly 50 can include an optical coupler 51 (e.g., an optical circulator) and an optical splice 52 configured to direct the interrogating light field 42 into an optical circuit 53 (e.g., a multifunction integrated-optic chip (MIOC) fabricated in $LiNbO_3$ and optically coupled to a sensing coil 54). The MIOC can comprise an integrated polarizer 55, a Y-junction 56, and push-pull phase modulators 57 driven by a square-wave modulation signal 58 at the loop proper frequency for dynamic biasing of the interferometer (see, e.g., H. Lefèvre, *The Fiber Optic Gyroscope*, Artech House 2014) from a waveform generator 59. The sensing coil 54 can comprise a quadrupolar-wound polarization-maintaining (PM) fiber wound in a coil 8-cm in diameter and having a coil length of 1085 m. The MIOC and the sensing coil 54 can be placed in a thermally isolated enclosure. All fibers in the FOG assembly 50 can be polarization maintaining. The returning light field can be detected using a high-speed photoreceiver module 60, and the FOG rotation signal 72 can be demodulated using a lock-in amplifier 70.

Figure 5B:
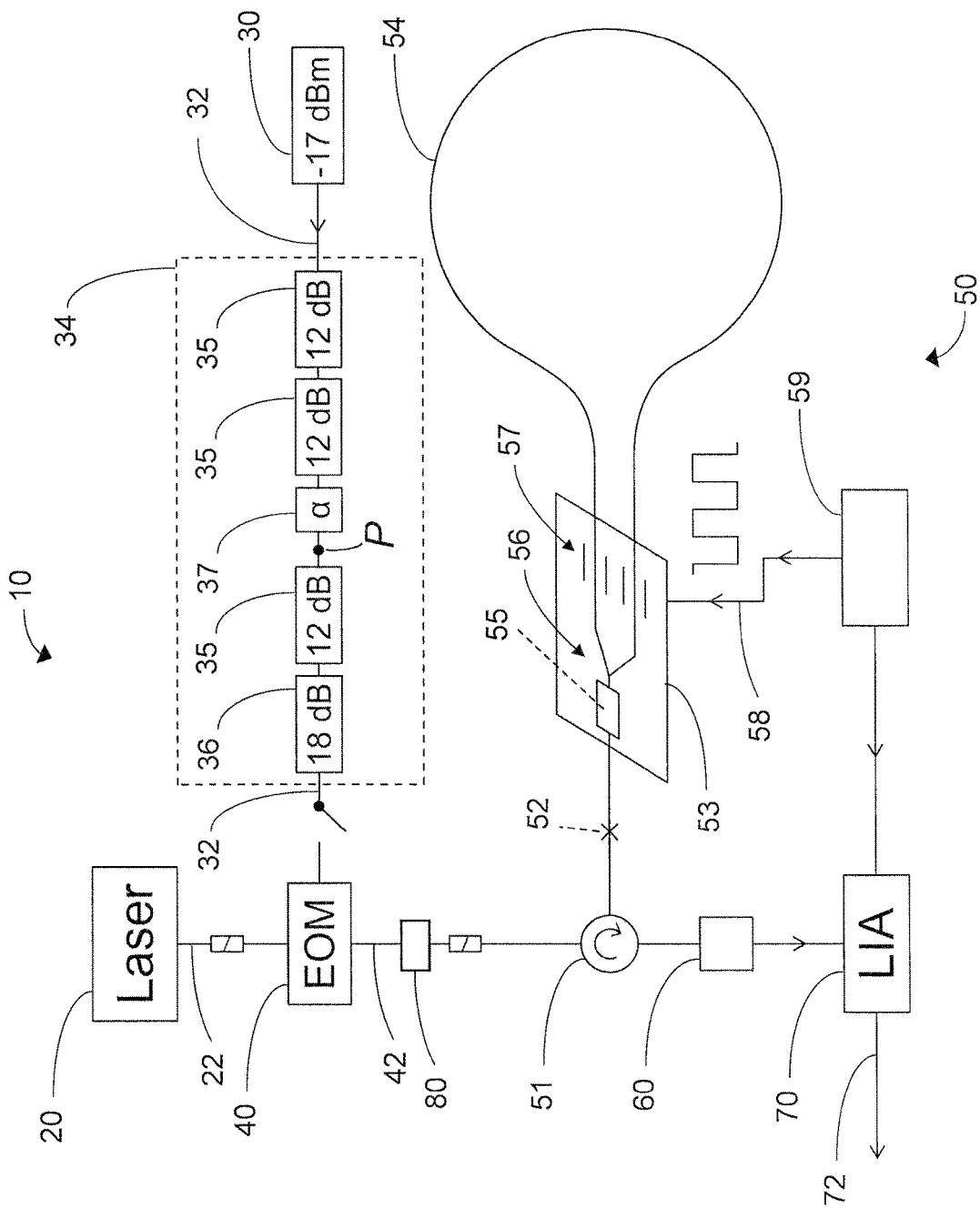
FIG. 5B schematically illustrates another example FOG optical system in accordance with certain embodiments described herein.

FIG. 5B schematically illustrates another example FOG optical system 10 in accordance with certain embodiments described herein. The example FOG optical system 10 includes the features of the example FOG optical system 10 schematically illustrated in FIG. 5A, along with a narrow-band optical notch filter 80 positioned between the output of the light source 20 and the optical coupler 51. In certain embodiments, the filter 80 can be advantageously used to relax operational requirements on the electronics that drive the EOM 40, and/or to help reduce the carrier fraction. The filter 80 can have a transmission that is close to unity over substantially all of the bandwidth of the broadened light (e.g., tens of GHz, but can be more or less depending on the bandwidth of the light from the light source 20), and the transmission can be low or very low in the vicinity of the residual (e.g., unbroadened) laser frequency. The notch of the filter 80 can have a Lorentzian lineshape, or a rectangular lineshape, or other lineshapes, with a full-width-at-half-maximum (FWHM) at least as broad as the FWHM linewidth of the unbroadened laser. In certain embodiments, the notch width is sized so as to minimize the amount of broadened light that it filters out and therefore wastes. The depth of the notch can be low, e.g., in the range of −5 dB and −30 dB or lower.

The filter 80 can be, for example, one of the plurality of slow-light resonances of a strong fiber Bragg grating (FBG) (see, e.g., G. Skolianos, A. Arora, M. Bernier, M. J. F. Digonnet, "Slowing Down Light to 300 km/s in a Deuterium-Loaded Fiber Bragg Grating," *Opt. Lett.* Vol. 40, No. 7, 1524-1527 (April 2015), G. Skolianos, A. Arora, M. Bernier, and M. J. F. Digonnet, "Photonics Sensing at the Thermodynamic Limit," *Opt. Lett.* Vol. 42, No. 10, 2018-2021 (May 2017), and references therein). These resonances can have a transmission as high as 85% or greater, and linewidths as narrow as 10 MHz or less. With suitable design, an FBG can be fabricated with linewidths that range from a fraction of 1 nm to 0.2 pm or less. In a given FBG, the resonances tend to exhibit different linewidths covering one or more orders of magnitude, and different transmissions that generally increase with increasing linewidth. A given slow-light FBG can then supply a choice of solutions for filtering a given broadened laser. The FBG can be used in the transmission or in the reflection mode (in the latter case adding an optical circulator to extract the reflected filtered signal). Other kinds of optical filters, in particular narrow conventional FBGs and interferometric filters, can also be used instead of a slow-light FBG.

Figure 9:
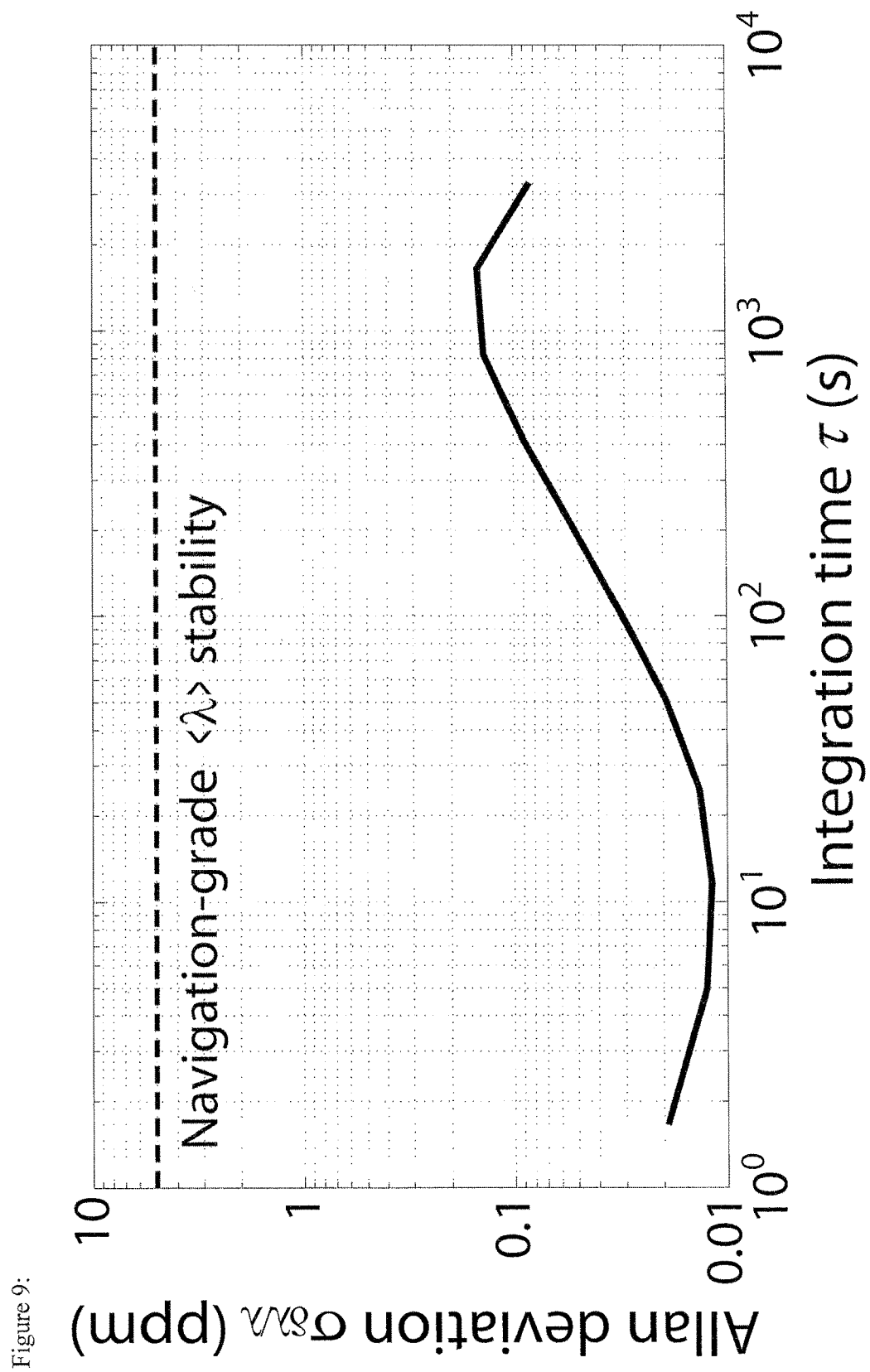
FIG. 9 is a plot of the measured Allan deviation of the mean-wavelength drift of the GWN phase-modulated Lucent laser used in the FOG measurements of FIG. 8.

As discussed herein in relation to FIG. 9, for a high scale-factor stability, the mean wavelength of the broadened laser is advantageously kept highly stable, especially against temperature variations. When the slow-light FBG filter is subjected to a temperature change, its transmission and reflection spectrum shifts as a whole, at the approximate rate of 10 picometers/° C. for an FBG fabricated in a silica-based fiber. As the FBG filter's notch shifts, the filtered spectrum of the broadened laser light transmitted by the filter changes, and so does its mean wavelength. This problem is solved by using an athermal FBG, which is readily accomplished in conventional FBGs using well-known packaging techniques.

Figure 6:
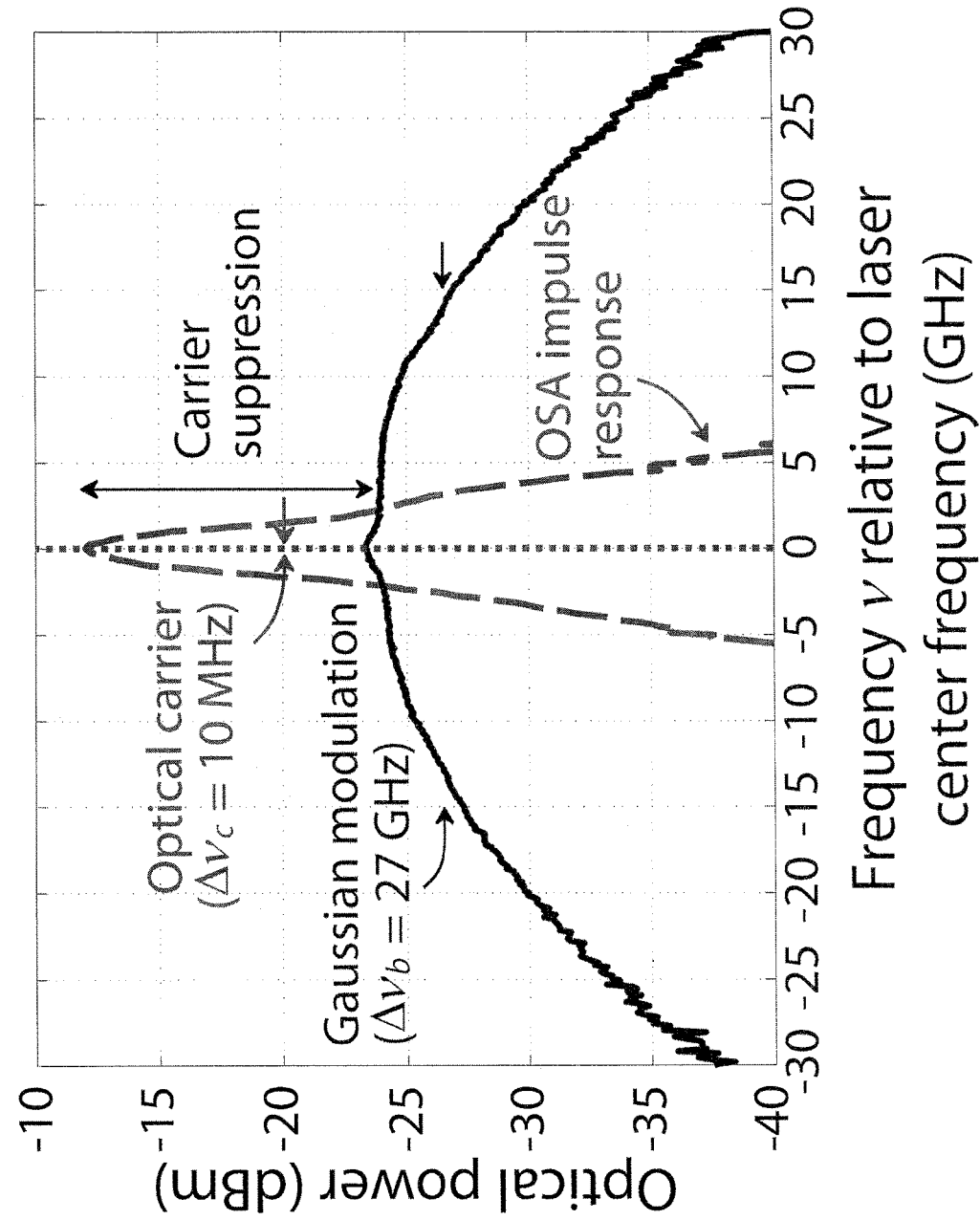
FIG. 6 is a plot of example representative optical spectra measured with and without Gaussian noise modulation in accordance with certain embodiments described herein.

FIG. 6 is a plot of example representative optical spectra measured using an optical spectrum analyzer (OSA) with and without Gaussian noise modulation in accordance with certain embodiments described herein. Without phase modulation, the laser lineshape (e.g., 0.08 pm) is much narrower than the OSA resolution (e.g., 0.01 nm), so it appeared as a peak corresponding to the OSA impulse response, as shown in FIG. 6. With GWN phase modulation, the optical spectrum showed two superimposed peaks: (i) a small and narrow peak corresponding to the residual optical carrier and (ii) a broad peak corresponding to the broadened component induced by phase modulation. Eq. (2) shows that, in the limit of GWN phase modulation with a large amplitude (almost always satisfied in this measurement), the lineshape of the broadened component asymptotically approaches a Gaussian lineshape (e.g., FIG. 2), as confirmed by the shape of the measured spectrum in FIG. 6.

To extract the width $\Delta v_b$ of the broad component and the carrier suppression $f_c$, the measured spectrum $S(\lambda)$ (e.g., as shown in FIG. 6) can be fitted to a relation of the form derived directly from Eq. (1) and Eq. (2):

$$S(\lambda) = f_c I(\lambda) + I_b \exp\left(-4(\ln 2)\frac{c^2}{\lambda_0^4}\frac{(\lambda-\lambda_0)^2}{\Delta v_b^2}\right) \qquad (7)$$

The first term of Eq. (7) represents the carrier component, where the OSA impulse response $I(\lambda)$ is the intensity spectrum measured with no modulation, and $f_c$ is the carrier suppression (e.g., the factor by which the carrier is suppressed when the modulation is on). With no modulation, the carrier suppression is $f_c$=1 (0 dB). The second term of Eq. (7) is the Gaussian broadened component with a peak intensity $I_b$ (e.g., units of mW/m$^2$), center wavelength $\lambda_0$ (e.g., units of nm), and FWHM width $\Delta v_b$ (e.g., units of Hz).

Figure 7:
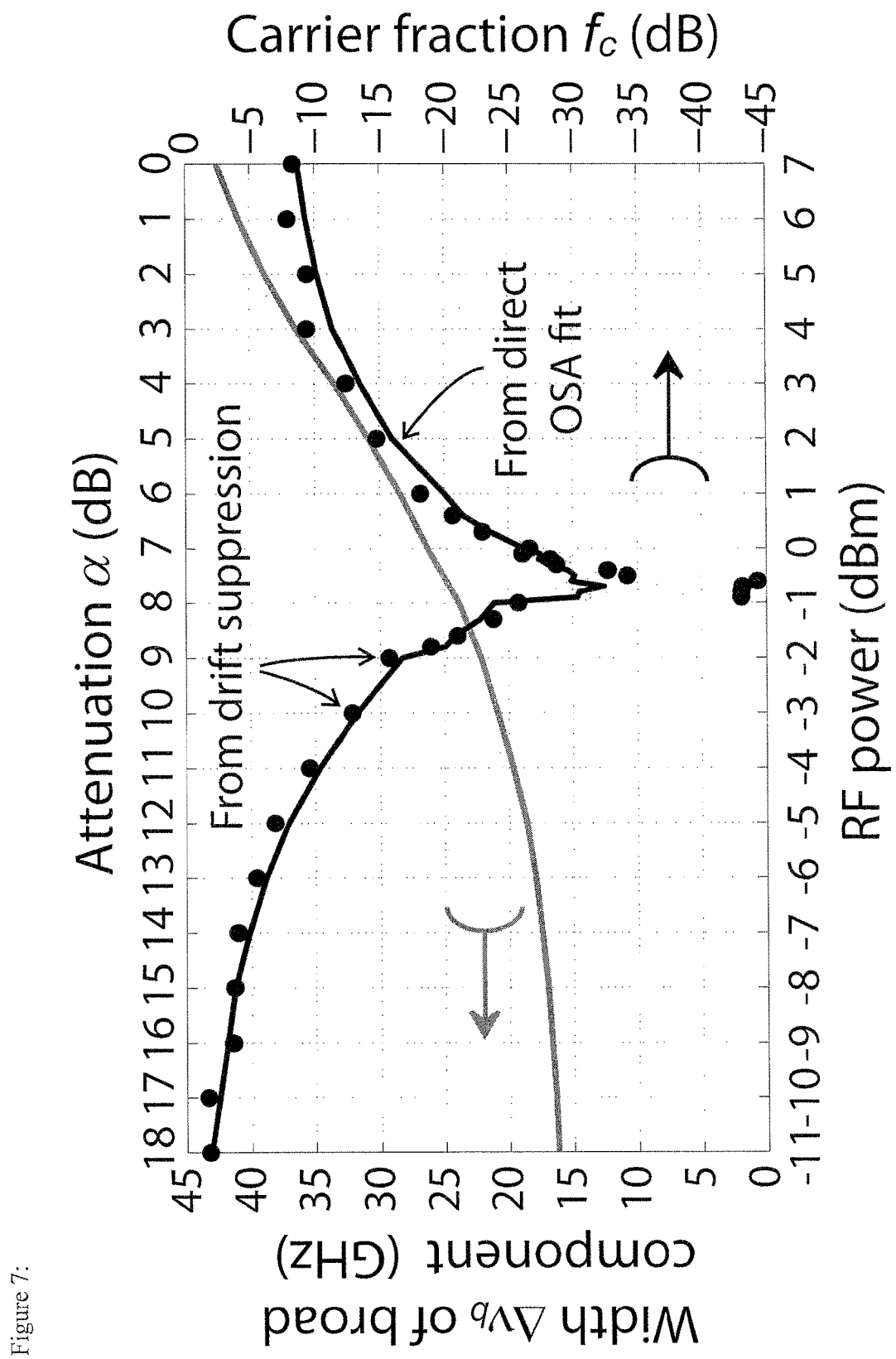
FIG. 7 is a plot of the spectral FWHM width $\Delta\nu_b$ of the broadened component and the carrier suppression $f_c$ (i) from the measured OSA spectra and (ii) inferred from drift suppression measurements, as functions of RF noise power.

FIG. 7 is a plot of the spectral FWHM width $\Delta v_b$ of the broadened component and the carrier suppression $f_c$ (i) from the measured OSA spectra (e.g., as shown in FIG. 6) and (ii) inferred from drift suppression measurements, as functions of RF noise power (e.g., for different levels of attenuation α in the RF noise amplification chain) at point P, immediately after the attenuator (e.g., as shown in FIG. 5). By selecting this particular location, none of the preceding amplifiers are saturated, whereas the following amplifiers are possibly saturated, depending on the attenuation, and therefore the carrier suppression depends on the power at that point.

The width of the broadened component in FIG. 7 was found to increase from around 17 GHz at small noise-modulation amplitudes to ~34 GHz at large amplitudes. Concurrently, as this amplitude was increased the carrier suppression in FIG. 7 decreased from 0 dB to a minimum of −32 dB, then increased to around −8 dB. This initial decrease and subsequent increase is the result of the interplay between the $V_\pi$ of the modulator and the saturation properties of the last two amplifiers in the RF amplification chain. For noise powers at point P below −1 dBm, the RF output from the last amplifier was well below its saturated output level of $V_{sat}$=25 dBm (12.6 $V_{pp}$). In that regime, decreasing the attenuation increased the noise power driving the EOM and increased the corresponding phase fluctuations added onto the optical field, suppressing the optical carrier to levels as low as −32 dB. For noise powers larger than −1 dBm, the last amplifier was saturated, and further decreasing the attenuation did not significantly increase the noise power driving the EOM. Instead, decreasing the attenuation clipped the amplified noise waveform (at measured levels of $\pm V_{sat}/2$). This nonlinear amplifier response caused the carrier suppression to increase.

To understand how clipping of the noise waveform degrades the carrier suppression, consider the case of an EOM with electro-optic efficiency $V_\pi$ driven by a strongly saturated amplifier whose output jumps instantaneously between $\pm V_{sat}/2$ randomly. In the worst case of $V_{sat}/V_\pi$=2, the phase shift imparted to the optical field jumps between 0 and 2π, which has no effect on its instantaneous optical frequency, and thus produces no carrier suppression and no broadening. For other values of $V_{sat}/V_\pi$, $f_c$ is given by:

$$f_c|_{sat} = \frac{1}{2}(1+\cos(\pi V_{sat}/V_\pi)) \qquad (8)$$

For the example FOG setup of FIG. 5, $V_{sat}$=12.6 V and $V_\pi$=4.7 V, and $f_c$=−6.4 dB (calculated mathematically from Eq. (8)), which is close to the observed (measured) carrier suppression of −8 dB in the saturated regime of FIG. 7. To reach this limit after an initial rapid decrease, $f_c$ starts to increase, achieving a minimum for an intermediate value of the RF attenuation, thereby providing a potential explanation for the behavior observed in FIG. 7.

For $f_c$ below 1%, only a tiny fraction of the original optical power remained in the carrier component, which made it difficult to distinguish the carrier in the spectrum measured by the OSA, and led to larger uncertainty in the estimate of $f_c$ in the region of interest where $f_c$ is small (e.g., the 95% confidence intervals shown in FIG. 7 as a solid light band). To overcome this dynamic-range limitation, the carrier suppression measurement was repeated using an alternative technique based on Eq. (6). From Eq. (6), if the drift from the carrier component is much larger than the drift from the broadened component, then the total drift with the phase modulation on is well approximated by the carrier component alone, e.g. $\varphi_{on} = f_c \varphi(\Delta v_c)$. With the phase modulation off, the drift is equal to $\varphi_{off} = \varphi(\Delta v_c)$. Thus, the drift suppression ratio $\varphi_{on}/\varphi_{off}$ between the total drift measured with modulation on/off provides an estimate of the carrier fraction $f_c$, so long as the condition of $f_c \varphi(\Delta v_c) \gg (1-f_c)\varphi(\Delta v_b)$ is satisfied (carrier drift dominant). The dynamic range with which one can measure $f_c$ using this technique is approximately equal to $\varphi(\Delta v_c)/\varphi(\Delta v_b)$. Thus, the dynamic range can be improved in certain embodiments by using a laser with a narrow original linewidth such that $\varphi(\Delta v_c)$ is large. For example, modeling of the FOG drift shows that when using a phase-broadened laser with an original linewidth under 10 kHz, the backscattering drift arising from the narrow-linewidth carrier component exceeds the drift from the broadened component in certain embodiments by as much as 45 dB (see, e.g., M. J. F. Digonnet and J. N. Chamoun, "*Recent developments in laser-driven and hollow-core fiber optic gyroscopes*," Proc. SPIE 9852, Fiber Optic Sensors and Applications XIII, 985204 (2016)). Thus by measuring the suppression in drift, $f_c$ could be measured with a dynamic range of up to 45 dB, much larger than was possible using the OSA.

To this end, the Lucent laser was temporarily replaced with a 2.2-kHz linewidth RIO ORION laser and the modulated laser output was directed into the 1085-m FOG shown schematically in FIG. 1C. The output trace of the FOG at rest was then recorded for anywhere between 60 s and 600 s, and the Allan variance of the rotation signal was calculated to compute the reduction in drift compared to the case with no modulation, and $f_c$ was then inferred. These measurements were repeated over the same range of RF power and are shown in FIG. 7 as black circles. For all measurements outside the critical range of −1 to −0.5 dBm, the drift was calculated as the minimum in the Allan variance (see, e.g., "IEEE Standard Specification Format Guide and Test Procedure for Single-Axis Interferometric Fiber Optic Gyros," *IEEE Std* 952-1997, 1998). For measurements inside this range, it was calculated as the endpoint in the Allan variance because no Allan variance minimum was observed. Using this method, the minimum in $f_c$ was estimated to be as low as −44 dB.

The two measurements shown in FIG. 7 each illustrate an advantage of GWN modulation in certain embodiments over PRBS modulation. First, the width of an optical spectrum broadened with PRBS modulation is limited to the bit rate $v_{PRBS}$ of the PRBS signal, so a bit rate of $v_{PRBS}$=11 GHz generates an optical spectrum with a FWHM around $\Delta v_b$=11 GHz (see, e.g., Keang-Po Ho and J. M. Kahn, "Spectrum of externally modulated optical signals," *J. of Lightwave Technol.* 22, 2, 658-663 (2004)). In contrast, with GWN modulation in accordance with certain embodiments described herein, the broadened spectrum can be significantly broader than the electrical bandwidth of the modulation signal. For example, an electrical noise signal with a bandwidth of 11 GHz generated a spectrum with a width of up to 43 GHz, as shown in FIG. 7, a factor of 4 larger than could be obtained with a PRBS for the same electrical bandwidth. This result shows that large optical linewidths in the tens of GHz range can be obtained in certain embodiments without the need for electronics with exceptionally high bandwidth. FIG. 7 also shows that $\Delta v_b$ and $f_c$ of certain embodiments are not very sensitive to the flatness of the electrical noise spectrum, which was assumed to be perfectly flat (e.g., having a top-hat spectrum, such as $$S_\phi(\omega) = \begin{cases} S_\phi & \omega < BW \\ 0 & \text{else} \end{cases}$$

when calculating the carrier fraction.

Further, models of PRBS-modulated light spectra with various modulation schemes have shown that, in addition to the optical carrier, the spectra almost always have a family of harmonics of the carrier spaced on a grid corresponding to the PRBS bit rate, and these harmonics carry a significant fraction of the optical power (see, e.g., Keang-Po Ho et al. cited above). These harmonics can be problematic in a FOG because they have very narrow linewidths and therefore induce backscattering noise and drift. For example, the bound on the suppression of the carrier and carrier harmonic content using PRBS modulation was previously measured to be only −8 dB. In comparison, FIG. 6 shows that with GWN phase modulation in accordance with certain embodiments described herein, there are no detectable carrier harmonics at multiples of the noise bandwidth of 11 GHz or anywhere else in the optical spectrum. In addition, FIG. 7 shows that, in certain embodiments, the suppression of the lone carrier component can be as strong as −45 dB, which is a 37 dB improvement from the PRBS case.

The carrier suppression level for aircraft navigation-grade FOG drift performance depends on the intrinsic laser linewidth. A laser with a broader linewidth induces less backscattering drift (see, e.g., S. W. Lloyd, M. J. F. Digonnet, and S. Fan, "Modeling coherent backscattering errors in fiber optic gyroscopes for sources of arbitrary line width," *J. of Lightwave Technol.* 31, 13, 2070-2078 (2013)) and therefore would utilize less carrier suppression than a laser with a narrower linewidth. Quantitatively, for the 10-MHz linewidth Lucent laser, a carrier suppression of $f_c \leq -13$ dB could be used, versus $f_c \leq -45$ dB for the 2.2-kHz linewidth RIO laser. These models also predict that $\Delta v_b \geq 40$ GHz would result in aircraft navigation-grade drift. From FIG. 7, it is evident that if the attenuation is selected to be less than 1.5 dB, so that $\Delta v_b$ exceeds 40 GHz, the carrier suppression will be only −8 dB, which is not strong enough to achieve navigation-grade drift for either laser. Thus, the operating point to obtain the lowest drift in a laser-driven FOG with GWN phase modulation in certain embodiments can be chosen to be that which most closely approximates the conditions on $f_c$ and $\Delta v_b$ for each laser (see, e.g., J. N. Chamoun and M. J. F. Digonnet, "Noise and Bias Error Due to Polarization Coupling in a Fiber Optic Gyroscope," *J. of Lightwave Technol.* 33, 13, 2839-2847 (2015)). For example, the RIO laser was operated with the strongest carrier suppression of −45 dB (e.g., attenuation of 7.8 dB), for which the corresponding broadened linewidth was 24 GHz. Though this linewidth was below the level of 40 GHz, the relatively weak $\Delta v_b^{1/2}$ dependence of drift on linewidth indicates that the drift would still be very close to aircraft-navigation grade. Only −13 dB of carrier suppression was used with the Lucent laser, so an attenuation of 4 dB was chosen, for which the amplifiers were operated further into saturation and the broadened linewidth was larger (e.g., 30 GHz).

Figure 8:
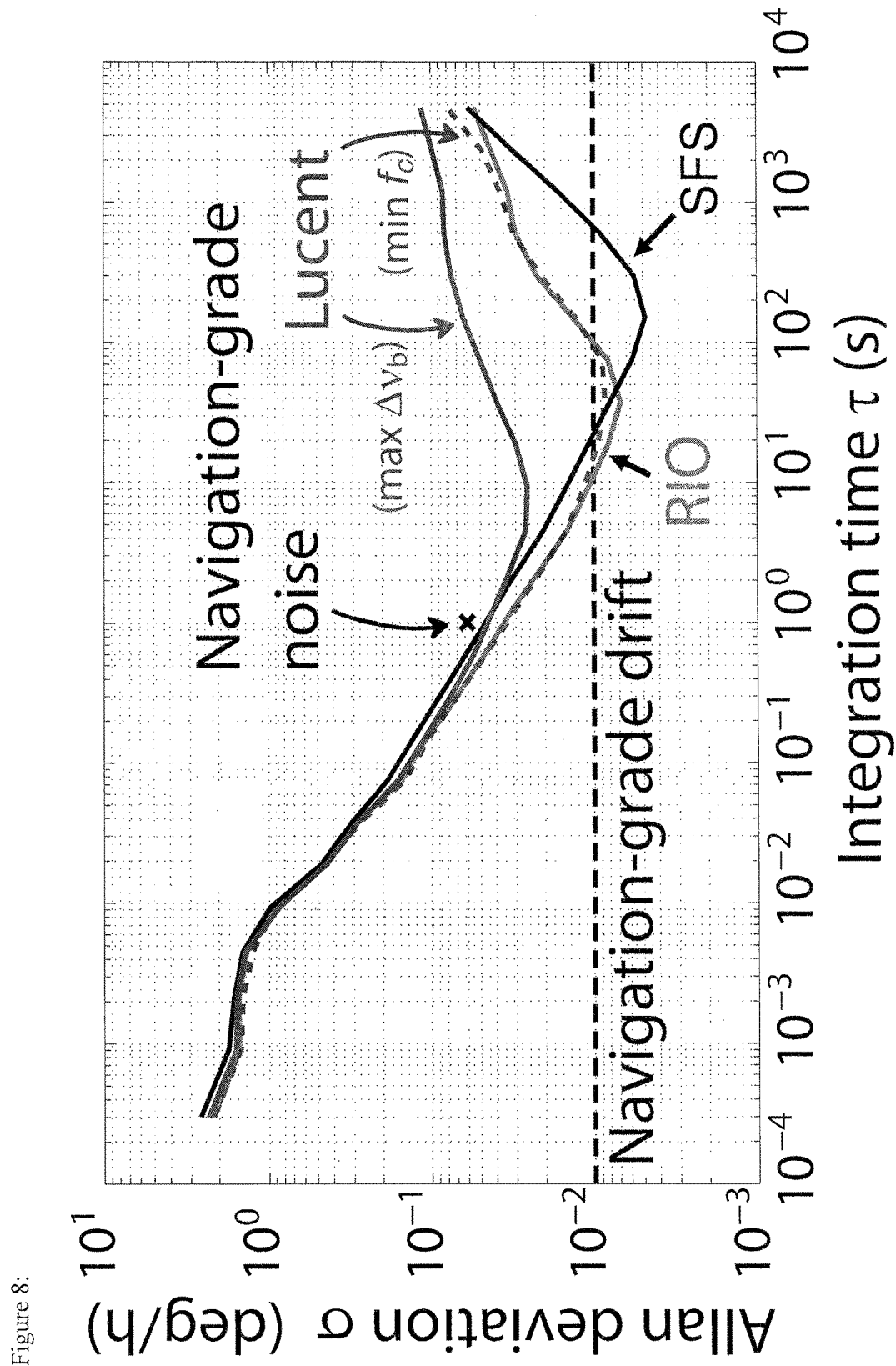
FIG. 8 is a plot of the measured Allen deviation of the FOG rotation rate signal driven by either one of two different lasers with Gaussian-white-noise phase modulation or a broadband Er-doped superfluorecent fiber source (SFS) for comparison.

FIG. 8 is a plot of the measured Allen deviation of the FOG rotation rate signal driven by either one of two different lasers with Gaussian-white-noise phase modulation or a broadband Er-doped superfluorecent fiber source (SFS) for comparison. The Allan deviation method can be used to characterize the noise and drift of the FOG driven by the broadened Lucent laser, the broadened RIO laser, or a broadband Er-doped SFS for comparison. The maximum time-averaged detected power on the photoreceiver was −17 dBm. The FWHM of the SFS spectrum was 17 nm. The angular random walk (ARW) noise of the 1085-m FOG driven by either modulated laser is $5.5 \times 10^{-4}$ deg/√h. This is the lowest measured noise yet reported in a laser-driven FOG, and it is almost 50% below the desired level for aircraft navigation of 0.001 deg/√h. FIG. 8 also shows the first demonstration of a modulation-broadened laser-driven FOG with noise below that of the same FOG driven by a conventional SFS. This noise reduction is the direct consequence of the lower RIN of the lasers compared to the SFS.

Under the conditions described above, the measured drift was 0.026 deg/h with the Lucent laser and 0.0068 deg/h with the RIO laser. The higher drift with the Lucent laser may be due to the fact that, at the large laser powers in use, the carrier linewidth was dominated by 1/f laser frequency noise, which is not included in the analytical model, causing the drift due to the carrier component to be larger than the predictions of the analytical model.

To check whether increased carrier suppression can improve this drift, the attenuation on the Lucent-laser modulation was increased from 4 dB to 7.8 dB, which increased the carrier suppression to −45 dB, and the Allan deviation of the FOG was remeasured, shown in FIG. 7 as a dashed line. The measured Allan deviation was substantially the same as with the RIO laser. The lowest measured drift was 0.0068 deg/h with either laser operated with maximum carrier suppression. This drift is below the aircraft-navigation drift level of 0.01 deg/h, and is a factor of 4 lower than the lowest drift previously reported in a laser-driven FOG. This drift is also virtually the same as the drift measured in the same FOG with an SFS.

In addition to this demonstration of unprecedented low drift in a laser-driven FOG, the confluence of the low noise and drift measurements with all three light sources points to several conclusions. First, the close match between the drift measured with the two lasers under conditions of maximum carrier suppression is remarkable given that, in the absence of phase modulation, the drifts in the FOG driven by these two lasers differ by more than 2 orders of magnitude as a result of their very different linewidths, and therefore backscattering noise. This result demonstrates that, in certain embodiments, this broadening technique can provide low noise and low drift independently of the intrinsic laser linewidth. Second, the similarity in the noise and drift measured with the broadened lasers and the SFS indicates that the noise and drift may be limited by coherence-independent mechanisms. Noise sources such as mechanical vibration or electronic noise associated with the open-loop demodulation scheme do not depend on the light source, so a lower noise may be obtained through better vibration isolation and elimination of all technical noise. Likewise, it is possible that the drift is limited by the Shupe effect, which is caused by thermal transients and which does not depend on the source coherence. In this case, lower drift may be achieved in certain embodiments through careful thermal design of the sensor along with temperature modeling of the output, as is commonly done in commercial FOGs.

The stability of the FOG scale factor can be expressed as $S=2\pi LD/(\langle \lambda \rangle c)$, where c is the speed of light in vacuum, and is dependent on the stability of the coil length L and diameter D, along with the mean wavelength $\langle \lambda \rangle$ of the light source (see, e.g., H. Lefèvre, cited above). Historically, the most important source of instability is the mean-wavelength instability of the Er-doped SFS, which is typically in the range of 10-100 ppm. A key advantage of using a laser is that the mean wavelength of a laser is much more stable than that of an SFS. FIG. 9 is a plot of the measured Allan deviation of the mean-wavelength drift of the GWN phase-modulated Lucent laser used in the FOG measurements of FIG. 8. The average wavelength was measured with the OSA every 1.7 seconds for 16 hours. The calculated Allan deviation of this wavelength data, which represents the mean-wavelength fluctuations of the broadened laser, is plotted in FIG. 5. As shown by FIG. 9, the mean-wavelength drift is at a level of at most 0.15 ppm, which is significantly lower than the 5-ppm navigation-grade level for aircraft navigation. This mean-wavelength drift is the same with and without phase modulation. This measured drift includes any drift from the OSA, so the true wavelength stability could be even better than this value.

In certain embodiments, the additional drift from the external phase modulator and associated electronics can be offset by integrating the modulator with the existing MIOC (e.g., in commercial FOGs), utilizing the same $LiNbO_3$ technology and processes. Comparing the phase noise and drift in this system to a high-performance commercial FOG based on a broadband source (see, e.g., H. C. Lefèvre, "The fiber-optic gyroscope, a century after Sagnac's experiment: The ultimate rotation-sensing technology?," C. R. Physique 15, 851-858 (2014)), the noise is a factor of 2 lower, the drift is 17 times higher, and the scale factor is at least 6.7 times more stable. This high-performance commercial FOG based on a broadband source used vibration isolation, active temperature control and modeling, and closed-loop signal processing. In certain embodiments which utilize the same additional improvements, the drift in the FOG as described herein can be closer to that of the high-performance commercial FOG based on a broadband source.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various embodiments and examples discussed above may be combined with one another to produce alternative configurations compatible with embodiments disclosed herein. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. An optical system comprising:
    a laser configured to generate light having a first laser spectrum with a first linewidth;
    a waveform generator configured to produce a noise waveform, the waveform generator comprising at least one noise source and at least one amplifier configured to amplify a source noise waveform from the at least one noise source to produce the noise waveform, the at least one amplifier having a saturation voltage level $V_{sat}$; and an electro-optic phase modulator in optical communication with the laser and in electrical communication with the waveform generator, the electro-optic phase modulator configured to receive the light having the first laser spectrum, to receive the noise waveform, and to respond to the noise waveform by modulating the light to produce light having a second laser spectrum with a second linewidth broader than the first linewidth, the electro-optic phase modulator having a voltage $V_\pi$ at which the electro-optic phase modulator produces a π-phase shift, wherein the saturation voltage level $V_{sat}$ and the voltage $V_\pi$ have a ratio $V_{sat}/V_\pi$ selected to minimize a power fraction $f_c$ of the first laser spectrum in the second laser spectrum.

2. The optical system of claim 1, wherein the laser comprises a single-transverse mode laser.

3. The optical system of claim 1, wherein the noise waveform is a Gaussian white-noise waveform.

4. The optical system of claim 3, wherein the Gaussian white-noise waveform has a cutoff bandwidth and a substantially constant power spectral density for frequencies between zero and the cutoff bandwidth.

5. The optical system of claim 1, wherein the at least one amplifier comprises one or more RF amplifiers.

6. The optical system of claim 1, wherein $V_{sat}$ has a peak-to-peak value such that $V_{sat}/V_\pi$ is within ±10% of an odd integer.

7. The optical system of claim 1, further comprising a sensor in optical communication with the electro-optic phase modulator and configured to receive the light having the second laser spectrum.

8. The optical system of claim 7, wherein the sensor comprises a fiber-optic gyroscope.

9. The optical system of claim 8, wherein the fiber-optic gyroscope comprises a multifunction integrated-optic chip (MIOC) and a sensing coil in optical communication with the MIOC, the MIOC in optical communication with the electro-optic phase modulator and configured to receive the light from the electro-optic phase modulator.

10. The optical system of claim 9, wherein the MIOC comprises a polarizer, a Y-junction, and push-pull phase modulators driven by a square-wave modulation signal at the loop proper frequency.

11. The optical system of claim 9, wherein the sensing coil comprises a quadrupolar-wound polarization-maintaining fiber having a coil length greater than 1 kilometer.

12. The optical system of claim 9, wherein the MIOC and the sensing coil are contained within a thermally isolated enclosure.

13. The optical system of claim 8, wherein the fiber-optic gyroscope has a noise level less than 0.001 degree/(hour)$^{1/2}$ and a drift level less than 0.01 degree/hour.

14. The optical system of claim 8, wherein the fiber-optic gyroscope has an angular random walk below 0.001 degree/(hour)$^{1/2}$ and a bias error drift below 0.01 degree/hour.

15. The optical system of claim 1, wherein the power fraction $f_c$ of the first laser spectrum in the second laser spectrum is below 1%.

16. The optical system of claim 1, wherein the power fraction $f_c$ of the first laser spectrum in the second laser spectrum is less than or equal to −13 dB.

17. A method of producing laser-based broadband light for use in an optical device, the method comprising:

using a laser to generate light having a first laser spectrum with a first linewidth;

producing a noise waveform using a waveform generator comprising at least one noise source and at least one amplifier configured to amplify a source noise waveform from the at least one noise source to produce the noise waveform, the at least one amplifier having a saturation voltage level $V_{sat}$; and in response to the noise waveform, using an electro-optic phase modulator in optical communication with the laser and in electrical communication with the waveform generator to modulate the light to have a second laser spectrum with a second linewidth broader than the first linewidth, the electro-optic phase modulator having a voltage $V_\pi$ at which the electro-optic phase modulator produces a π-phase shift, wherein the saturation voltage level $V_{sat}$ and the voltage $V_\pi$ have a ratio $V_{sat}/V_\pi$ selected to minimize a power fraction $f_c$ of the first laser spectrum in the second laser spectrum.

18. The method of claim 17, wherein the noise waveform is a Gaussian white-noise waveform.

19. The method of claim 18, wherein the Gaussian white-noise waveform has a cutoff bandwidth and a substantially constant power spectral density for frequencies between zero and the cutoff bandwidth.

20. The method of claim 17, further comprising inputting the light having the second laser spectrum into a sensor.

21. The method of claim 20, wherein the sensor comprises a fiber-optic gyroscope.

22. The method of claim 21, wherein the fiber-optic gyroscope has a noise level less than 0.001 degree/(hour)$^{1/2}$ and a drift level less than 0.01 degree/hour.

23. The method of claim 21, wherein the fiber-optic gyroscope has an angular random walk below 0.001 degree/(hour)$^{1/2}$ and a bias error drift below 0.01 degree/hour.

24. The method of claim 17, wherein the power fraction $f_c$ of the first laser spectrum in the second laser spectrum is below 1%.

25. The method of claim 17, wherein the power fraction $f_c$ of the first laser spectrum in the second laser spectrum is less than or equal to −13 dB.

* * * * *

UNITED STATES PATENT AND TRADEMARK OFFICE
CERTIFICATE OF CORRECTION

PATENT NO. : 10,228,250 B2
APPLICATION NO. : 15/707343
DATED : March 12, 2019
INVENTOR(S) : Chamoun et al.

It is certified that error appears in the above-identified patent and that said Letters Patent is hereby corrected as shown below:

In the Specification

Column 9, Line 36, change "$S_{100}$." to --$S_\phi$.--.

Column 9, Line 37, change "$S_{100}$" to --$S_\phi$--.

Signed and Sealed this
Second Day of July, 2019

Andrei Iancu
*Director of the United States Patent and Trademark Office*